United States Patent
Line et al.

(10) Patent No.: US 10,046,683 B2
(45) Date of Patent: Aug. 14, 2018

(54) SUSPENSION SEAT BACK AND CUSHION SYSTEM HAVING AN INNER SUSPENSION PANEL

(71) Applicant: Ford Global Technologies, LLC, Dearborn, MI (US)

(72) Inventors: Johnathan Andrew Line, Northville, MI (US); Michael Kolich, Windsor (CA); Daniel Ferretti, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 306 days.

(21) Appl. No.: 15/062,800

(22) Filed: Mar. 7, 2016

(65) Prior Publication Data

US 2016/0185266 A1 Jun. 30, 2016

Related U.S. Application Data

(63) Continuation of application No. 14/162,072, filed on Jan. 23, 2014.

(51) Int. Cl.
*B60N 2/70* (2006.01)
*B60N 2/72* (2006.01)
(Continued)

(52) U.S. Cl.
CPC ........... *B60N 2/7094* (2013.01); *B60N 2/504* (2013.01); *B60N 2/542* (2013.01); *B60N 2/548* (2013.01);
(Continued)

(58) Field of Classification Search
CPC ........ B60N 2/7094; B60N 2/54; B60N 2/542; B60N 2/548; B60N 2/028; B60N 2/62;
(Continued)

(56) References Cited

U.S. PATENT DOCUMENTS 462,317 A 11/1891 Kenfield
616,178 A 12/1898 Barron
(Continued)

FOREIGN PATENT DOCUMENTS

CN 201650491 U 11/2010
DE 3115269 A1 10/1982
(Continued)

OTHER PUBLICATIONS

Matthew W Ing, United States Patent and Trademark Office, Non Final Office Communication re U.S. Appl. No. 13/749,561, dated Oct. 16, 2015, 33 pages.
(Continued)

*Primary Examiner* — Milton Nelson, Jr.
(74) *Attorney, Agent, or Firm* — Vichit Chea; Price Heneveld LLP

(57) ABSTRACT

A vehicle seating assembly includes a frame and an inner suspension panel coupled to the frame. A plurality of suspension members attach the frame to the inner suspension panel. Each suspension member has a tab that is biased away from the inner suspension panel and is operable between extended and compressed positions. A cushion is coupled to at least one of the tabs. The cushion includes a plurality of comfort positions defined by the position of each of the tabs.

20 Claims, 11 Drawing Sheets

(51) Int. Cl.
 *B60N 2/54* (2006.01)
 *B60N 2/68* (2006.01)
 *B60N 2/64* (2006.01)
 *B60N 2/62* (2006.01)
 *B60N 2/50* (2006.01)

(52) U.S. Cl.
 CPC ............... *B60N 2/64* (2013.01); *B60N 2/686* (2013.01); *B60N 2/72* (2013.01); *B60N 2/62* (2013.01)

(58) Field of Classification Search
 CPC .......... B60N 2/72; B60N 2/686; B60N 2/504; B60N 2/64
 See application file for complete search history.

(56) References Cited

U.S. PATENT DOCUMENTS

| | | | |
|---|---|---|---|
| 714,752 A | 12/1902 | Shea | |
| 771,773 A | 10/1904 | Feely | |
| 958,356 A | 5/1910 | Bode | |
| 1,125,155 A | 1/1915 | Nunn | |
| 1,724,864 A | 8/1929 | Wisner | |
| 1,769,434 A | 7/1930 | Jones | |
| 1,804,722 A | 5/1931 | Van Hove | |
| 1,880,137 A * | 9/1932 | Hilton | A47C 7/025 267/92 |
| 2,272,505 A | 2/1942 | Biggs | |
| 2,384,713 A | 9/1945 | Varma | |
| 2,661,050 A | 12/1953 | Felter | |
| 2,725,921 A | 12/1955 | Markin | |
| 2,742,957 A | 4/1956 | Young | |
| 2,781,083 A | 2/1957 | Agrillo | |
| 2,834,606 A | 5/1958 | Bertrand | |
| 2,938,570 A | 5/1960 | Flajole | |
| 2,958,369 A | 11/1960 | Pitts et al. | |
| 3,007,738 A | 11/1961 | Gardel et al. | |
| 3,018,133 A | 1/1962 | Mills | |
| 3,273,877 A | 9/1966 | Geller et al. | |
| 3,330,598 A | 7/1967 | Whiteside | |
| 3,403,938 A | 10/1968 | Cramer et al. | |
| 3,481,327 A | 12/1969 | Drennen | |
| 3,512,605 A | 5/1970 | McCorkle | |
| 3,520,327 A | 7/1970 | Claydon et al. | |
| 3,550,953 A | 12/1970 | Neale | |
| 3,592,508 A | 7/1971 | Druseikis | |
| 3,612,607 A | 10/1971 | Lohr | |
| 3,632,166 A | 1/1972 | Lohr | |
| 3,663,057 A | 5/1972 | Lohr et al. | |
| 3,669,492 A | 6/1972 | Peterson | |
| 3,779,577 A | 12/1973 | Wilfert | |
| 3,792,897 A | 2/1974 | Alson | |
| 3,795,019 A | 3/1974 | Fragas | |
| 3,795,021 A | 3/1974 | Moniot | |
| 3,813,151 A | 5/1974 | Cadiou | |
| 3,833,257 A | 9/1974 | Dove | |
| 3,877,749 A | 4/1975 | Sakurai et al. | |
| 3,880,462 A | 4/1975 | Mednick | |
| 3,883,173 A | 5/1975 | Shephard et al. | |
| 3,885,831 A | 5/1975 | Rasmussen | |
| 3,915,421 A | 10/1975 | Le Forestier | |
| 3,929,374 A | 12/1975 | Hogan et al. | |
| 4,017,118 A | 4/1977 | Cawley | |
| 4,018,477 A | 4/1977 | Hogan | |
| 4,058,342 A | 11/1977 | Ettridge | |
| 4,115,170 A | 9/1978 | Sanson | |
| 4,190,286 A | 2/1980 | Bentley | |
| 4,205,877 A | 6/1980 | Ettridge | |
| 4,225,989 A | 10/1980 | Corbett et al. | |
| 4,306,322 A | 12/1981 | Young et al. | |
| 4,324,431 A | 4/1982 | Murphy et al. | |
| 4,334,709 A | 6/1982 | Akiyama et al. | |
| 4,353,595 A | 10/1982 | Kaneko et al. | |
| 4,366,985 A | 1/1983 | Leffler | |
| 4,415,203 A | 11/1983 | Cawley | |
| 4,437,702 A | 3/1984 | Agosta | |
| 4,440,443 A | 4/1984 | Nordskog | |
| 4,444,430 A | 4/1984 | Yoshida et al. | |
| 4,452,485 A | 6/1984 | Schuster | |
| 4,467,484 A | 8/1984 | Nagatake et al. | |
| 4,491,364 A | 1/1985 | Hattori et al. | |
| 4,491,365 A | 1/1985 | Murakami | |
| 4,518,201 A | 5/1985 | Wahlmann et al. | |
| 4,522,445 A | 6/1985 | Göldner et al. | |
| 4,541,669 A | 9/1985 | Goldner | |
| 4,580,837 A | 4/1986 | Bayley | |
| 4,583,255 A | 4/1986 | Mogaki et al. | |
| 4,583,781 A | 4/1986 | Hatsutta et al. | |
| 4,589,695 A | 5/1986 | Isono | |
| 4,592,588 A | 6/1986 | Isono et al. | |
| 4,609,221 A | 9/1986 | Böttcher | |
| 4,616,676 A | 10/1986 | Adams et al. | |
| 4,616,874 A | 10/1986 | Pietsch et al. | |
| 4,629,248 A | 12/1986 | Mawbey | |
| 4,629,253 A | 12/1986 | Williams | |
| 4,634,179 A | 1/1987 | Hashimoto et al. | |
| 4,655,505 A | 4/1987 | Kashiwamura et al. | |
| 4,664,444 A | 5/1987 | Murphy | |
| 4,668,014 A | 5/1987 | Boisset | |
| 4,693,513 A | 9/1987 | Heath | |
| 4,707,027 A | 11/1987 | Horvath et al. | |
| 4,711,497 A | 12/1987 | Kazaoka et al. | |
| 4,718,723 A | 1/1988 | Bottemiller | |
| 4,720,141 A | 1/1988 | Sakamoto et al. | |
| 4,720,146 A | 1/1988 | Mawbey et al. | |
| 4,726,086 A | 2/1988 | McEvoy | |
| 4,752,982 A | 6/1988 | Jones et al. | |
| 4,753,479 A | 6/1988 | Hatsutta et al. | |
| 4,767,155 A | 8/1988 | Kousaka et al. | |
| 4,773,703 A | 9/1988 | Krügener et al. | |
| 4,775,185 A | 10/1988 | Scholin et al. | |
| 4,781,413 A | 11/1988 | Shumack, Jr. | |
| 4,790,592 A | 12/1988 | Busso et al. | |
| 4,792,186 A | 12/1988 | Benjamin et al. | |
| 4,796,313 A | 1/1989 | DiMatteo et al. | |
| 4,822,092 A | 4/1989 | Sweers | |
| 4,833,614 A | 5/1989 | Saitoh et al. | |
| 4,840,429 A | 6/1989 | Stöckl | |
| 4,856,844 A | 8/1989 | Isono | |
| 4,858,992 A | 8/1989 | LaSota | |
| 4,861,104 A | 8/1989 | Malak | |
| 4,865,383 A | 9/1989 | Sbaragli et al. | |
| 4,878,529 A | 11/1989 | Hormann | |
| 4,884,843 A | 12/1989 | DeRees | |
| 4,893,365 A | 1/1990 | Justice | |
| 4,893,367 A | 1/1990 | Heimreid et al. | |
| 4,915,447 A | 4/1990 | Shovar | |
| 4,938,529 A | 7/1990 | Fourrey | |
| 4,965,899 A | 10/1990 | Sekido et al. | |
| 4,966,410 A | 10/1990 | Bishai | |
| 4,971,380 A | 11/1990 | Cote et al. | |
| 5,013,089 A | 5/1991 | Abu-Isa et al. | |
| 5,018,790 A | 5/1991 | Jay | |
| 5,020,852 A | 6/1991 | Marion | |
| 5,050,930 A | 9/1991 | Schuster et al. | |
| 5,054,845 A | 10/1991 | Vogel | |
| 5,054,856 A | 10/1991 | Wang | |
| 5,067,772 A | 11/1991 | Koa | |
| 5,082,326 A | 1/1992 | Sekido et al. | |
| 5,096,529 A | 3/1992 | Baker | |
| 5,104,189 A | 4/1992 | Hanai et al. | |
| 5,108,150 A | 4/1992 | Stas et al. | |
| 5,112,018 A | 5/1992 | Wahls | |
| 5,120,109 A | 6/1992 | Rangoni | |
| 5,127,708 A | 7/1992 | Kishi et al. | |
| 5,129,704 A | 7/1992 | Kishi et al. | |
| 5,145,232 A | 9/1992 | Dal Monte | |
| 5,171,062 A | 12/1992 | Courtois | |
| 5,174,526 A | 12/1992 | Kanigowski | |
| 5,186,494 A | 2/1993 | Shimose | |
| 5,190,348 A | 3/1993 | Colasanti | |
| 5,203,608 A | 4/1993 | Tame | |
| 5,222,784 A | 6/1993 | Hamelin | |
| 5,243,722 A | 9/1993 | Gusakov | |

(56) References Cited

U.S. PATENT DOCUMENTS

| | | |
|---|---|---|
| 5,263,765 A | 11/1993 | Nagashima et al. |
| 5,280,997 A | 1/1994 | Andres et al. |
| 5,285,754 A | 2/1994 | Bell |
| 5,318,344 A | 6/1994 | Wang |
| 5,320,409 A | 6/1994 | Katoh et al. |
| 5,323,740 A | 6/1994 | Daily et al. |
| 5,364,164 A | 11/1994 | Kuranami |
| 5,370,443 A | 12/1994 | Maruyama |
| 5,375,569 A | 12/1994 | Santella |
| 5,380,063 A | 1/1995 | Dauphin |
| 5,443,303 A | 8/1995 | Bauer et al. |
| 5,458,365 A | 10/1995 | Rogers et al. |
| 5,518,292 A | 5/1996 | Cozzani |
| 5,518,294 A | 5/1996 | Ligon, Sr. et al. |
| 5,544,942 A | 8/1996 | Vu Khac et al. |
| 5,547,214 A | 8/1996 | Zimmerman, II et al. |
| 5,560,681 A | 10/1996 | Dixon et al. |
| 5,570,716 A | 11/1996 | Kamen et al. |
| 5,588,708 A | 12/1996 | Rykken et al. |
| 5,597,203 A | 1/1997 | Hubbard |
| 5,609,394 A | 3/1997 | Ligon, Sr. et al. |
| 5,647,635 A | 7/1997 | Aumond et al. |
| 5,658,050 A | 8/1997 | Lorbiecki |
| 5,662,384 A | 9/1997 | O'Neill et al. |
| 5,667,427 A | 9/1997 | Airhart et al. |
| 5,678,891 A | 10/1997 | O'Neill et al. |
| 5,681,084 A | 10/1997 | Yoneda |
| 5,690,387 A | 11/1997 | Sarti |
| 5,692,802 A | 12/1997 | Aufrere et al. |
| 5,707,109 A | 1/1998 | Massara et al. |
| 5,738,368 A | 4/1998 | Hammond et al. |
| 5,755,493 A | 5/1998 | Kodaverdian |
| 5,758,924 A | 6/1998 | Vishey |
| 5,769,489 A | 6/1998 | Dellanno |
| 5,772,280 A | 6/1998 | Massara |
| 5,775,778 A | 7/1998 | Riley et al. |
| 5,785,669 A | 7/1998 | Proctor et al. |
| 5,799,971 A | 9/1998 | Asada |
| 5,803,490 A | 9/1998 | Seventko et al. |
| 5,815,393 A | 9/1998 | Chae |
| 5,823,620 A | 10/1998 | Le Caz |
| 5,826,312 A | 10/1998 | Schroder et al. |
| 5,826,938 A | 10/1998 | Yanase et al. |
| 5,836,648 A | 11/1998 | Karschin et al. |
| 5,860,699 A | 1/1999 | Weeks |
| 5,863,092 A | 1/1999 | Kifer |
| 5,868,450 A | 2/1999 | Hashimoto |
| 5,882,073 A | 3/1999 | Burchi et al. |
| 5,893,609 A | 4/1999 | Schmidt |
| 5,895,070 A | 4/1999 | Crimmins et al. |
| 5,902,014 A | 5/1999 | Dinkel et al. |
| 5,906,586 A | 5/1999 | Graham |
| 5,913,568 A | 6/1999 | Brightbill et al. |
| 5,918,696 A | 7/1999 | Vanvoorhies |
| 5,944,341 A | 8/1999 | Kimura et al. |
| 5,951,039 A | 9/1999 | Severinski et al. |
| 5,967,608 A | 10/1999 | Van Sickle |
| 5,975,629 A | 11/1999 | Lorbiecki |
| 5,975,637 A | 11/1999 | Geuss et al. |
| 5,979,985 A | 11/1999 | Bauer et al. |
| 5,983,940 A | 11/1999 | Smith |
| 5,988,674 A | 11/1999 | Kimura et al. |
| 6,019,387 A | 2/2000 | Jost |
| 6,024,378 A | 2/2000 | Fu |
| 6,024,406 A | 2/2000 | Charras et al. |
| 6,030,040 A | 2/2000 | Schmid et al. |
| 6,045,151 A | 4/2000 | Wu |
| 6,050,635 A | 4/2000 | Pajon et al. |
| 6,056,366 A | 5/2000 | Haynes et al. |
| 6,062,642 A | 5/2000 | Sinnhuber et al. |
| 6,068,339 A | 5/2000 | Linzalone |
| 6,079,767 A | 6/2000 | Faubert et al. |
| 6,079,781 A | 6/2000 | Tilley |
| 6,088,642 A | 7/2000 | Finkelstein et al. |
| 6,106,071 A | 8/2000 | Aebischer et al. |
| 6,106,163 A | 8/2000 | Inana et al. |
| 6,109,690 A | 8/2000 | Wu et al. |
| 6,145,925 A | 11/2000 | Eksin et al. |
| 6,155,593 A | 12/2000 | Kimura et al. |
| 6,158,812 A | 12/2000 | Bonke |
| 6,161,231 A | 12/2000 | Kraft et al. |
| 6,179,379 B1 | 1/2001 | Andersson |
| 6,189,966 B1 | 2/2001 | Faust et al. |
| 6,196,627 B1 | 3/2001 | Faust et al. |
| 6,199,252 B1 | 3/2001 | Masters et al. |
| 6,199,900 B1 | 3/2001 | Zeigler |
| 6,199,951 B1 | 3/2001 | Zeile et al. |
| 6,203,105 B1 | 3/2001 | Rhodes, Jr. |
| 6,206,466 B1 | 3/2001 | Komatsu |
| 6,209,915 B1 | 4/2001 | Blakesly |
| 6,213,557 B1 | 4/2001 | Aebischer et al. |
| 6,217,062 B1 | 4/2001 | Breyvogel et al. |
| 6,217,118 B1 | 4/2001 | Heilig |
| 6,220,661 B1 | 4/2001 | Peterson |
| 6,224,150 B1 | 5/2001 | Eksin et al. |
| 6,231,068 B1 | 5/2001 | White, Jr. et al. |
| 6,231,076 B1 | 5/2001 | Blakesley et al. |
| 6,234,518 B1 | 5/2001 | Ryl et al. |
| 6,273,810 B1 | 8/2001 | Rhodes, Jr. et al. |
| 6,296,308 B1 | 10/2001 | Cosentino et al. |
| 6,302,431 B1 | 10/2001 | Sasaki et al. |
| 6,312,050 B1 | 11/2001 | Eklind |
| 6,341,797 B1 | 1/2002 | Seo |
| 6,349,993 B1 | 2/2002 | Walsh |
| 6,352,304 B1 | 3/2002 | Sorgenfrei |
| 6,352,310 B1 | 3/2002 | Schmidt et al. |
| 6,357,066 B1 | 3/2002 | Pierce |
| 6,357,789 B1 | 3/2002 | Harada et al. |
| 6,357,827 B1 | 3/2002 | Brightbill et al. |
| 6,364,414 B1 | 4/2002 | Specht |
| 6,375,269 B1 | 4/2002 | Maeda et al. |
| 6,382,720 B1 | 5/2002 | Franklin et al. |
| 6,386,577 B1 | 5/2002 | Kan et al. |
| 6,390,557 B1 | 5/2002 | Asano |
| 6,394,525 B1 | 5/2002 | Seibold |
| 6,394,546 B1 | 5/2002 | Knoblock et al. |
| 6,398,299 B1 | 6/2002 | Angerer et al. |
| 6,398,306 B1 | 6/2002 | Mack |
| 6,409,269 B1 | 6/2002 | Aebischer et al. |
| 6,419,317 B1 | 7/2002 | Westrich et al. |
| 6,425,602 B1 | 7/2002 | Al-Amin et al. |
| 6,431,734 B1 | 8/2002 | Curry |
| 6,439,597 B1 | 8/2002 | Harada et al. |
| 6,450,571 B1 | 9/2002 | Canni et al. |
| 6,454,353 B1 | 9/2002 | Knaus |
| 6,457,741 B2 | 10/2002 | Seki et al. |
| 6,474,733 B1 | 11/2002 | Heilig et al. |
| 6,523,892 B1 | 2/2003 | Kage et al. |
| 6,523,902 B2 | 2/2003 | Robinson |
| 6,530,622 B1 | 3/2003 | Ekern et al. |
| 6,550,856 B1 | 4/2003 | Ganser et al. |
| 6,554,365 B2 | 4/2003 | Karschin et al. |
| 6,557,887 B2 | 5/2003 | Wohllebe |
| 6,561,540 B1 | 5/2003 | Hasegawa et al. |
| 6,565,150 B2 | 5/2003 | Fischer et al. |
| 6,565,153 B2 | 5/2003 | Hensel et al. |
| 6,568,754 B1 | 5/2003 | Norton et al. |
| 6,578,911 B2 | 6/2003 | Harada et al. |
| 6,588,838 B1 | 7/2003 | Dick, Jr. et al. |
| 6,595,586 B2 | 7/2003 | Brightbill et al. |
| 6,612,610 B1 | 9/2003 | Aoki et al. |
| 6,616,177 B2 | 9/2003 | Thomas et al. |
| 6,619,605 B2 | 9/2003 | Lambert |
| 6,619,737 B2 | 9/2003 | Kunkel et al. |
| 6,629,715 B2 | 10/2003 | Oh et al. |
| 6,637,818 B2 | 10/2003 | Williams |
| 6,672,666 B2 | 1/2004 | Stiller et al. |
| 6,682,059 B1 | 1/2004 | Daniels et al. |
| 6,682,140 B2 | 1/2004 | Minuth et al. |
| 6,695,406 B2 | 2/2004 | Plant |
| 6,698,832 B2 | 3/2004 | Boudinot |
| 6,719,373 B2 | 4/2004 | Zimmermann |
| 6,726,280 B1 | 4/2004 | Liao |
| 6,733,064 B2 | 5/2004 | Fox et al. |

(56) References Cited

U.S. PATENT DOCUMENTS

| | | |
|---|---|---|
| 6,736,452 B2 | 5/2004 | Aoki et al. |
| 6,746,077 B2 | 6/2004 | Klukowski |
| 6,758,522 B2 | 7/2004 | Ligon, Sr. et al. |
| 6,779,560 B1 | 8/2004 | Reis |
| 6,786,542 B1 | 9/2004 | Nuzzarello |
| 6,802,563 B1 | 10/2004 | Mysliwiec et al. |
| 6,808,230 B2 | 10/2004 | Buss et al. |
| 6,811,219 B2 | 11/2004 | Hudswell et al. |
| 6,820,640 B2 | 11/2004 | Hand et al. |
| 6,820,930 B2 | 11/2004 | Dellanno |
| 6,824,212 B2 | 11/2004 | Malsch et al. |
| 6,848,742 B1 | 2/2005 | Aoki et al. |
| 6,854,869 B1 | 2/2005 | Fernandez |
| 6,860,559 B2 | 3/2005 | Schuster, Sr. et al. |
| 6,860,564 B2 | 3/2005 | Reed et al. |
| 6,866,339 B2 | 3/2005 | Itoh |
| 6,869,140 B2 | 3/2005 | White et al. |
| 6,890,029 B2 | 5/2005 | Svantesson |
| 6,890,030 B2 | 5/2005 | Wilkerson et al. |
| 6,899,399 B2 | 5/2005 | Ali et al. |
| 6,905,173 B2 | 6/2005 | Tame et al. |
| 6,908,151 B2 | 6/2005 | Meeker et al. |
| 6,912,748 B2 | 7/2005 | VanSickle |
| 6,929,324 B2 | 8/2005 | Enomoto et al. |
| 6,938,953 B2 | 9/2005 | Håland et al. |
| 6,955,399 B2 | 10/2005 | Hong |
| 6,962,392 B2 | 11/2005 | O'Connor |
| 6,988,770 B2 | 1/2006 | Witchie |
| 6,991,256 B2 | 1/2006 | Henderson et al. |
| 6,991,289 B2 | 1/2006 | House |
| 6,994,399 B2 | 2/2006 | Van-Thournout et al. |
| 6,997,473 B2 | 2/2006 | Tanase et al. |
| 7,025,423 B2 | 4/2006 | Fujita et al. |
| 7,040,699 B2 | 5/2006 | Curran et al. |
| 7,055,904 B2 | 6/2006 | Skelly et al. |
| 7,059,678 B1 | 6/2006 | Taylor |
| 7,068,178 B2 | 6/2006 | Oh |
| 7,072,764 B2 | 7/2006 | Donath et al. |
| 7,093,898 B2 | 8/2006 | Ladron De Guevara |
| 7,100,978 B2 | 9/2006 | Ekern et al. |
| 7,100,992 B2 | 9/2006 | Bargheer et al. |
| 7,108,322 B2 | 9/2006 | Erker |
| 7,111,901 B2 | 9/2006 | Schlierf et al. |
| 7,125,077 B2 | 10/2006 | Frank |
| 7,131,694 B1 | 11/2006 | Buffa |
| 7,131,756 B2 | 11/2006 | Leslie et al. |
| 7,134,686 B2 | 11/2006 | Tracht et al. |
| 7,140,682 B2 | 11/2006 | Jaeger et al. |
| 7,143,658 B2 | 12/2006 | Schubert |
| 7,152,920 B2 | 12/2006 | Sugiyama et al. |
| 7,159,934 B2 | 1/2007 | Farquhar et al. |
| 7,159,938 B1 | 1/2007 | Shiraishi |
| 7,185,950 B2 | 3/2007 | Pettersson et al. |
| 7,195,274 B2 | 3/2007 | Tracht |
| 7,195,277 B2 | 3/2007 | Tracht et al. |
| 7,213,876 B2 | 5/2007 | Stoewe |
| 7,213,883 B2 | 5/2007 | Charnitski |
| 7,216,915 B2 | 5/2007 | Kämmerer et al. |
| 7,229,118 B2 | 6/2007 | Saberan et al. |
| 7,229,129 B2 | 6/2007 | White et al. |
| 7,234,771 B2 | 6/2007 | Nakhla |
| 7,261,316 B1 | 8/2007 | Salmo et al. |
| 7,261,371 B2 | 8/2007 | Thunissen et al. |
| 7,267,363 B2 | 9/2007 | Tredez |
| 7,284,768 B2 | 10/2007 | Tracht |
| 7,290,791 B2 | 11/2007 | Tracht |
| 7,293,831 B2 | 11/2007 | Greene |
| 7,311,681 B1 | 12/2007 | Vaccarella |
| 7,316,215 B1 | 1/2008 | Nino et al. |
| 7,322,651 B2 | 1/2008 | Makhsous et al. |
| 7,325,878 B1 | 2/2008 | Dehli |
| 7,341,309 B2 | 3/2008 | Penley et al. |
| 7,344,189 B2 | 3/2008 | Reed et al. |
| 7,344,195 B2 | 3/2008 | Folkert et al. |
| 7,347,444 B2 | 3/2008 | Wheelwright |
| 7,350,803 B2 | 4/2008 | Abramczyk et al. |
| 7,350,859 B2 | 4/2008 | Klukowski |
| 7,350,865 B2 | 4/2008 | Pearse |
| 7,357,412 B2 | 4/2008 | Tracht et al. |
| 7,357,454 B2 | 4/2008 | Schiener et al. |
| 7,382,240 B2 | 6/2008 | Egelhaaf |
| 7,387,339 B2 | 6/2008 | Bykov et al. |
| 7,393,005 B2 | 7/2008 | Inazu et al. |
| 7,401,852 B2 | 7/2008 | Humer et al. |
| 7,413,253 B2 | 8/2008 | Karlberg |
| 7,425,034 B2 | 9/2008 | Bajic et al. |
| 7,441,797 B2 | 10/2008 | Tracht et al. |
| 7,441,838 B2 | 10/2008 | Patwardhan |
| 7,445,292 B2 | 11/2008 | Moule |
| 7,467,823 B2 | 12/2008 | Hartwich |
| 7,478,869 B2 | 1/2009 | Lazanja et al. |
| 7,481,489 B2 | 1/2009 | Demick |
| 7,488,040 B2 | 2/2009 | Dozsa-Farkas |
| 7,506,924 B2 | 3/2009 | Bargheer et al. |
| 7,506,938 B2 | 3/2009 | Brennan et al. |
| 7,517,015 B2 | 4/2009 | Terada et al. |
| 7,517,024 B2 | 4/2009 | Cvek |
| 7,523,888 B2 | 4/2009 | Ferry et al. |
| 7,530,633 B2 | 5/2009 | Yokota et al. |
| 7,540,529 B2 | 6/2009 | Tracht et al. |
| 7,543,888 B2 | 6/2009 | Kuno |
| 7,547,068 B2 | 6/2009 | Davis |
| 7,562,934 B2 | 7/2009 | Swan et al. |
| 7,578,552 B2 | 8/2009 | Bajic et al. |
| 7,578,554 B2 | 8/2009 | Lee et al. |
| 7,597,398 B2 | 10/2009 | Lindsay |
| 7,604,294 B2 | 10/2009 | Jane Santamaria |
| 7,611,199 B2 | 11/2009 | Michalak et al. |
| 7,614,693 B2 | 11/2009 | Ito |
| 7,637,568 B2 | 12/2009 | Meeker et al. |
| 7,640,090 B2 | 12/2009 | Uchida et al. |
| 7,641,281 B2 | 1/2010 | Grimm |
| 7,668,329 B2 | 2/2010 | Matsuhashi |
| 7,669,888 B2 | 3/2010 | Sato et al. |
| 7,669,925 B2 | 3/2010 | Beck et al. |
| 7,669,928 B2 | 3/2010 | Snyder |
| 7,669,929 B2 | 3/2010 | Simon et al. |
| 7,677,594 B2 | 3/2010 | Hazlewood et al. |
| 7,677,598 B1 | 3/2010 | Ryan et al. |
| 7,699,339 B2 | 4/2010 | Jang et al. |
| 7,712,833 B2 | 5/2010 | Ueda |
| 7,717,459 B2 | 5/2010 | Bostrom et al. |
| 7,717,509 B2 | 5/2010 | Kojima |
| 7,726,733 B2 | 6/2010 | Balser et al. |
| 7,735,932 B2 | 6/2010 | Lazanja et al. |
| 7,752,720 B2 | 7/2010 | Smith |
| 7,753,451 B2 | 7/2010 | Maebert et al. |
| 7,775,552 B2 | 8/2010 | Breuninger et al. |
| 7,775,602 B2 | 8/2010 | Lazanja et al. |
| 7,784,819 B2 | 8/2010 | Lawall et al. |
| 7,784,863 B2 | 8/2010 | Fallen |
| 7,793,973 B2 | 9/2010 | Sato et al. |
| 7,794,012 B2 | 9/2010 | Szablewski |
| 7,798,570 B2 | 9/2010 | Kwiecinski et al. |
| 7,802,809 B2 | 9/2010 | Ryan et al. |
| 7,802,843 B2 | 9/2010 | Andersson et al. |
| 7,810,969 B2 | 10/2010 | Blackmore et al. |
| 7,819,470 B2 | 10/2010 | Humer et al. |
| 7,819,480 B2 | 10/2010 | Asbury et al. |
| 7,823,971 B2 | 11/2010 | Humer et al. |
| 7,845,729 B2 | 12/2010 | Yamada et al. |
| 7,850,235 B2 | 12/2010 | Veine et al. |
| 7,850,247 B2 | 12/2010 | Stauske et al. |
| 7,857,381 B2 | 12/2010 | Humer et al. |
| 7,862,113 B2 | 1/2011 | Knoll |
| 7,862,117 B2 | 1/2011 | Hutchinson et al. |
| 7,866,689 B2 | 1/2011 | Saberan |
| 7,871,126 B2 | 1/2011 | Becker et al. |
| 7,871,129 B2 | 1/2011 | Boes et al. |
| 7,878,535 B2 | 2/2011 | Rose et al. |
| 7,878,596 B2 | 2/2011 | Brunner et al. |
| 7,887,094 B2 | 2/2011 | Sakaida |
| 7,891,701 B2 | 2/2011 | Tracht et al. |
| 7,901,002 B2 | 3/2011 | Mashimo |

(56) References Cited

U.S. PATENT DOCUMENTS

| | | |
|---|---|---|
| 7,909,360 B2 | 3/2011 | Marriott et al. |
| 7,909,401 B2 | 3/2011 | Hofmann et al. |
| 7,909,403 B2 | 3/2011 | Lawall et al. |
| 7,922,142 B2 | 4/2011 | Koutsky et al. |
| 7,926,871 B2 | 4/2011 | Meixner et al. |
| 7,926,872 B2 | 4/2011 | Chida et al. |
| 7,931,294 B2 | 4/2011 | Okada et al. |
| 7,931,330 B2 | 4/2011 | Itou et al. |
| 7,934,708 B2 | 5/2011 | Haller |
| 7,938,440 B2 | 5/2011 | Kataoka et al. |
| 7,946,649 B2 | 5/2011 | Galbreath et al. |
| 7,959,225 B2 | 6/2011 | Humer et al. |
| 7,959,226 B2 | 6/2011 | Hattori et al. |
| 7,963,553 B2 | 6/2011 | Huynh et al. |
| 7,963,595 B2 | 6/2011 | Ito et al. |
| 7,963,600 B2 | 6/2011 | Alexander et al. |
| 7,966,835 B2 | 6/2011 | Petrovski |
| 7,967,379 B2 | 6/2011 | Walters et al. |
| 7,971,931 B2 | 7/2011 | Lazanja et al. |
| 7,971,937 B2 | 7/2011 | Ishii et al. |
| 7,976,103 B2 | 7/2011 | Gamache et al. |
| 8,011,726 B2 | 9/2011 | Omori et al. |
| 8,011,728 B2 | 9/2011 | Kohl et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,056,923 B2 | 11/2011 | Shimono |
| 8,075,053 B2 | 12/2011 | Tracht et al. |
| 8,100,471 B2 | 1/2012 | Lawall et al. |
| 8,109,569 B2 | 2/2012 | Mitchell |
| 8,111,147 B2 | 2/2012 | Litkouhi |
| 8,113,539 B2 | 2/2012 | Paruszkiewicz et al. |
| 8,123,246 B2 | 2/2012 | Gilbert et al. |
| 8,126,615 B2 | 2/2012 | McMillen et al. |
| D655,393 S | 3/2012 | Whitaker |
| 8,128,167 B2 | 3/2012 | Zhong et al. |
| 8,141,945 B2 | 3/2012 | Akaike et al. |
| 8,162,391 B2 | 4/2012 | Lazanja et al. |
| 8,162,392 B2 | 4/2012 | Humer et al. |
| 8,162,397 B2 | 4/2012 | Booth et al. |
| 8,167,370 B2 | 5/2012 | Arakawa et al. |
| 8,167,376 B2 | 5/2012 | Song |
| 8,177,256 B2 | 5/2012 | Smith et al. |
| 8,196,887 B2 | 6/2012 | Dahlbacka et al. |
| 8,201,883 B2 | 6/2012 | Wuerstlein et al. |
| 8,210,568 B2 | 7/2012 | Ryden et al. |
| 8,210,605 B2 | 7/2012 | Hough et al. |
| 8,210,611 B2 | 7/2012 | Aldrich et al. |
| 8,226,113 B2 | 7/2012 | Yamashita |
| 8,226,165 B2 | 7/2012 | Mizoi |
| 8,231,138 B2 | 7/2012 | Sadr et al. |
| 8,240,758 B2 | 8/2012 | Combest |
| 8,240,764 B2 | 8/2012 | Ropp et al. |
| 8,245,340 B2 | 8/2012 | Hsu |
| 8,251,396 B2 | 8/2012 | Zothke et al. |
| 8,297,708 B2 | 10/2012 | Mizobata et al. |
| 8,328,227 B2 | 12/2012 | Shimono |
| 8,328,231 B2 | 12/2012 | Nakamura et al. |
| 8,336,910 B1 | 12/2012 | Kalisz et al. |
| 8,342,607 B2 | 1/2013 | Hofmann et al. |
| 8,348,338 B2 | 1/2013 | Galecka et al. |
| 8,360,517 B2 | 1/2013 | Lazanja et al. |
| 8,360,529 B2 | 1/2013 | Armbruster |
| 8,360,530 B2 | 1/2013 | Onoda et al. |
| 8,371,655 B2 | 2/2013 | Nonomiya |
| 8,388,061 B2 | 3/2013 | Saito et al. |
| 8,397,688 B2 | 3/2013 | Cunningham |
| 8,398,114 B2 | 3/2013 | Laframboise et al. |
| 8,403,410 B1 | 3/2013 | Pinger et al. |
| 8,408,646 B2 | 4/2013 | Harper et al. |
| 8,447,473 B2 | 5/2013 | Sugiyama et al. |
| 8,469,395 B2 | 6/2013 | Richez et al. |
| 8,469,450 B2 | 6/2013 | Wahls et al. |
| 8,474,778 B2 | 7/2013 | Jacobson |
| 8,474,917 B2 | 7/2013 | Line et al. |
| 8,511,748 B2 | 8/2013 | McLeod et al. |
| 8,516,842 B2 | 8/2013 | Petrovski |
| 8,534,760 B2 | 9/2013 | Kotz |
| 8,540,318 B2 | 9/2013 | Folkert et al. |
| 8,585,144 B2 | 11/2013 | Huttenhuis |
| 8,590,978 B2 | 11/2013 | Jaranson et al. |
| 8,602,493 B1 | 12/2013 | Chen et al. |
| 8,657,378 B2 | 2/2014 | Kunert et al. |
| 8,672,352 B2 | 3/2014 | Tracht et al. |
| 8,678,500 B2 | 3/2014 | Lem et al. |
| 8,696,067 B2 | 4/2014 | Galbreath et al. |
| 8,727,374 B1 | 5/2014 | Line et al. |
| 8,752,894 B2 | 6/2014 | Trimbom et al. |
| 8,794,707 B2 | 8/2014 | Bocsanyi et al. |
| 8,807,594 B2 | 8/2014 | Mizobata |
| 8,827,371 B2 | 9/2014 | Brncick et al. |
| 8,899,683 B2 | 12/2014 | Ito |
| 8,905,431 B1 | 12/2014 | Line et al. |
| 8,967,663 B2 | 3/2015 | Seki et al. |
| 8,979,204 B2 | 3/2015 | Awata et al. |
| 9,096,157 B2 | 8/2015 | Line et al. |
| 9,102,247 B2 | 8/2015 | Li et al. |
| 9,126,504 B2 | 9/2015 | Line et al. |
| 9,126,508 B2 | 9/2015 | Line et al. |
| 9,193,289 B2 | 11/2015 | Takahashi et al. |
| 9,272,647 B2 | 3/2016 | Gawade et al. |
| 9,283,873 B2 | 3/2016 | Line et al. |
| 9,320,361 B2 | 4/2016 | Gaines et al. |
| 9,365,142 B1 | 6/2016 | Line et al. |
| 9,421,894 B2 | 8/2016 | Line et al. |
| 2001/0011812 A1 | 8/2001 | Seki et al. |
| 2002/0096915 A1 | 7/2002 | Haupt et al. |
| 2002/0113473 A1 | 8/2002 | Knaus |
| 2002/0145512 A1 | 10/2002 | Sleichter, III et al. |
| 2003/0023363 A1 | 1/2003 | Katz et al. |
| 2003/0025370 A1 | 2/2003 | Hensel et al. |
| 2003/0038517 A1 | 2/2003 | Moran et al. |
| 2003/0137178 A1 | 7/2003 | Craft et al. |
| 2003/0213105 A1 | 11/2003 | Bednarski |
| 2004/0012237 A1 | 1/2004 | Horiki et al. |
| 2004/0084937 A1 | 5/2004 | Berta |
| 2004/0108760 A1 | 6/2004 | McMillen |
| 2004/0129585 A1 | 7/2004 | Ballantine et al. |
| 2004/0144349 A1 | 7/2004 | Wampula et al. |
| 2004/0183351 A1 | 9/2004 | Johnson et al. |
| 2004/0195870 A1 | 10/2004 | Bohlender et al. |
| 2004/0212589 A1 | 10/2004 | Hall et al. |
| 2005/0035642 A1 | 2/2005 | Hake et al. |
| 2005/0077762 A1 | 4/2005 | Kraemer et al. |
| 2005/0082895 A1 | 4/2005 | Kimmig |
| 2005/0127734 A1 | 6/2005 | Veine et al. |
| 2005/0140193 A1 | 6/2005 | Skelly et al. |
| 2005/0179287 A1 | 8/2005 | Hankins |
| 2005/0179291 A1 | 8/2005 | Brodeur |
| 2005/0179306 A1 | 8/2005 | White et al. |
| 2005/0184569 A1 | 8/2005 | Penley et al. |
| 2005/0189752 A1 | 9/2005 | Itoga et al. |
| 2005/0200166 A1 | 9/2005 | Noh |
| 2005/0248189 A1 | 11/2005 | Prasatek et al. |
| 2005/0253429 A1 | 11/2005 | Veine et al. |
| 2005/0258624 A1 | 11/2005 | Abraham et al. |
| 2006/0043777 A1 | 3/2006 | Friedman et al. |
| 2006/0113751 A1 | 6/2006 | Tracht et al. |
| 2006/0113762 A1 | 6/2006 | Tracht et al. |
| 2006/0113765 A1 | 6/2006 | Tracht |
| 2006/0152062 A1 | 7/2006 | Archambault et al. |
| 2006/0155429 A1 | 7/2006 | Boone et al. |
| 2006/0214487 A1 | 9/2006 | Holdampf et al. |
| 2006/0220434 A1 | 10/2006 | Schulz et al. |
| 2006/0244301 A1 | 11/2006 | Jeffries |
| 2007/0029853 A1 | 2/2007 | Forgatsch et al. |
| 2007/0090673 A1 | 4/2007 | Ito |
| 2007/0118259 A1 | 5/2007 | Chernoff et al. |
| 2007/0120401 A1 | 5/2007 | Minuth et al. |
| 2007/0138844 A1 | 6/2007 | Kim |
| 2007/0170707 A1 | 7/2007 | Sato et al. |
| 2007/0200398 A1 | 8/2007 | Wolas et al. |
| 2007/0241593 A1 | 10/2007 | Woerner |
| 2007/0296194 A1 | 12/2007 | Ridgway |

(56) References Cited

U.S. PATENT DOCUMENTS

| | | |
|---|---|---|
| 2008/0036258 A1 | 2/2008 | Holdampf et al. |
| 2008/0067850 A1 | 3/2008 | Stenstrom et al. |
| 2008/0122241 A1 | 5/2008 | Blackmore et al. |
| 2008/0136240 A1 | 6/2008 | Matthews et al. |
| 2008/0157577 A1 | 7/2008 | Lindsay |
| 2008/0174159 A1 | 7/2008 | Kojima et al. |
| 2008/0231099 A1 | 9/2008 | Szczepkowski et al. |
| 2008/0252111 A1 | 10/2008 | Rothkop et al. |
| 2009/0039690 A1 | 2/2009 | Simon et al. |
| 2009/0066122 A1 | 3/2009 | Minuth et al. |
| 2009/0085383 A1 | 4/2009 | Hicks et al. |
| 2009/0102255 A1 | 4/2009 | D'Agostini et al. |
| 2009/0140569 A1 | 6/2009 | Mashimo |
| 2009/0152909 A1 | 6/2009 | Andersson |
| 2009/0160167 A1 | 6/2009 | Itoga |
| 2009/0165263 A1 | 7/2009 | Smith |
| 2009/0195041 A1 | 8/2009 | Ito et al. |
| 2009/0224584 A1 | 9/2009 | Lawall et al. |
| 2009/0302660 A1 | 12/2009 | Karlberg et al. |
| 2009/0315372 A1 | 12/2009 | Tracht |
| 2009/0322124 A1 | 12/2009 | Barkow et al. |
| 2010/0007122 A1 | 1/2010 | Clauser et al. |
| 2010/0026066 A1 | 2/2010 | Graber et al. |
| 2010/0038937 A1 | 2/2010 | Andersson et al. |
| 2010/0102599 A1 | 4/2010 | Itou et al. |
| 2010/0109397 A1 | 5/2010 | Bandurski et al. |
| 2010/0109401 A1 | 5/2010 | Booth et al. |
| 2010/0117414 A1 | 5/2010 | Hwang et al. |
| 2010/0133794 A1 | 6/2010 | Tracht et al. |
| 2010/0140986 A1 | 6/2010 | Sawada |
| 2010/0140992 A1 | 6/2010 | Yamaguchi |
| 2010/0148546 A1 | 6/2010 | Demontis et al. |
| 2010/0148948 A1 | 6/2010 | Murphy et al. |
| 2010/0171346 A1 | 7/2010 | Laframboise et al. |
| 2010/0187881 A1 | 7/2010 | Fujita et al. |
| 2010/0201167 A1 | 8/2010 | Wieclawski |
| 2010/0207438 A1 | 8/2010 | Inoue et al. |
| 2010/0207443 A1 | 8/2010 | Brncick |
| 2010/0231013 A1 | 9/2010 | Schlenker |
| 2010/0270840 A1 | 10/2010 | Tanaka et al. |
| 2010/0283229 A1 | 11/2010 | Feller et al. |
| 2010/0286867 A1 | 11/2010 | Bergholz et al. |
| 2010/0295282 A1 | 11/2010 | Kim et al. |
| 2010/0295354 A1* | 11/2010 | Hsu .................. A47C 31/126 297/344.12 |
| 2010/0301650 A1 | 12/2010 | Hong |
| 2010/0319796 A1 | 12/2010 | Whitaker |
| 2010/0320816 A1 | 12/2010 | Michalak |
| 2010/0327636 A1 | 12/2010 | Stoll et al. |
| 2011/0018498 A1 | 1/2011 | Soar |
| 2011/0055720 A1 | 3/2011 | Potter et al. |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |
| 2011/0133525 A1 | 6/2011 | Oota |
| 2011/0155084 A1 | 6/2011 | Sargeant |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0199200 A1 | 8/2011 | Lueke et al. |
| 2011/0215200 A1 | 9/2011 | Mejuhas |
| 2011/0248532 A1 | 10/2011 | Kim et al. |
| 2011/0254335 A1 | 10/2011 | Pradier et al. |
| 2011/0260506 A1 | 10/2011 | Kuno |
| 2011/0260509 A1 | 10/2011 | Siu |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0285194 A1 | 11/2011 | Marom |
| 2011/0298261 A1 | 12/2011 | Holt et al. |
| 2011/0309604 A1 | 12/2011 | Moore et al. |
| 2012/0013161 A1 | 1/2012 | Adams et al. |
| 2012/0032478 A1 | 2/2012 | Friderich et al. |
| 2012/0032486 A1 | 2/2012 | Baker et al. |
| 2012/0037754 A1 | 2/2012 | Kladde |
| 2012/0041648 A1 | 2/2012 | Yamaguchi et al. |
| 2012/0043791 A1 | 2/2012 | Kojima |
| 2012/0049597 A1 | 3/2012 | Brewer et al. |
| 2012/0049599 A1 | 3/2012 | Barzen et al. |
| 2012/0063081 A1 | 3/2012 | Grunwald |
| 2012/0080914 A1 | 4/2012 | Wang |
| 2012/0081234 A1 | 4/2012 | Shaffer et al. |
| 2012/0081544 A1 | 4/2012 | Wee |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0112515 A1 | 5/2012 | Labish |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0161481 A1 | 6/2012 | Tache et al. |
| 2012/0162891 A1 | 6/2012 | Tranchina et al. |
| 2012/0167845 A1 | 7/2012 | Sands et al. |
| 2012/0175924 A1 | 7/2012 | Festag et al. |
| 2012/0187729 A1 | 7/2012 | Fukawatase et al. |
| 2012/0187731 A1 | 7/2012 | Guadagno |
| 2012/0222900 A1 | 9/2012 | Rodney et al. |
| 2012/0248833 A1 | 10/2012 | Hontz et al. |
| 2012/0248839 A1 | 10/2012 | Fujita et al. |
| 2012/0261974 A1 | 10/2012 | Yoshizawa et al. |
| 2012/0267878 A1 | 10/2012 | Kalisz et al. |
| 2012/0299342 A1 | 11/2012 | Mizobata |
| 2013/0015643 A1 | 1/2013 | Gorman et al. |
| 2013/0076092 A1 | 3/2013 | Kulkarni et al. |
| 2013/0119646 A1 | 5/2013 | Tracht |
| 2013/0119715 A1 | 5/2013 | Medoro et al. |
| 2013/0119723 A1 | 5/2013 | Nitsuma |
| 2013/0119724 A1 | 5/2013 | Adachi et al. |
| 2013/0119741 A1 | 5/2013 | Medoro et al. |
| 2013/0134749 A1 | 5/2013 | Awata et al. |
| 2013/0181492 A1 | 7/2013 | Prescott et al. |
| 2013/0220877 A1 | 8/2013 | Stern |
| 2013/0241255 A1 | 9/2013 | Kulkarni et al. |
| 2013/0285426 A1 | 10/2013 | Arant et al. |
| 2013/0306825 A1 | 11/2013 | Brodersen |
| 2013/0320730 A1 | 12/2013 | Aselage |
| 2013/0320742 A1 | 12/2013 | Murolo et al. |
| 2013/0341975 A1 | 12/2013 | Schneider et al. |
| 2013/0342366 A1 | 12/2013 | Kiefer et al. |
| 2013/0343072 A1 | 12/2013 | Ehrmann et al. |
| 2014/0032043 A1 | 1/2014 | Line et al. |
| 2014/0042781 A1 | 2/2014 | Reeves |
| 2014/0054944 A1 | 2/2014 | Locke et al. |
| 2014/0058305 A1 | 2/2014 | Batterson et al. |
| 2014/0062147 A1 | 3/2014 | Bashir et al. |
| 2014/0070594 A1 | 3/2014 | Awata et al. |
| 2014/0077565 A1 | 3/2014 | Baumgarten et al. |
| 2014/0135991 A1 | 5/2014 | Summer et al. |
| 2014/0139979 A1 | 5/2014 | Blazic |
| 2014/0152057 A1 | 6/2014 | Truant et al. |
| 2014/0167465 A1 | 6/2014 | Sakata et al. |
| 2014/0180181 A1 | 6/2014 | von Oepen et al. |
| 2014/0203606 A1 | 7/2014 | Line et al. |
| 2014/0203610 A1 | 7/2014 | Line et al. |
| 2014/0203617 A1 | 7/2014 | Line et al. |
| 2014/0265506 A1 | 9/2014 | McMillen et al. |
| 2014/0300145 A1 | 10/2014 | Beroth et al. |
| 2014/0300167 A1 | 10/2014 | Datta |
| 2014/0333107 A1* | 11/2014 | Seki .................. B60N 2/62 297/284.1 |
| 2014/0361571 A1 | 12/2014 | Line et al. |
| 2014/0375100 A1 | 12/2014 | Reese |
| 2015/0108816 A1 | 4/2015 | Dry et al. |
| 2015/0157481 A1 | 6/2015 | Whitaker et al. |
| 2015/0157482 A1 | 6/2015 | Batterson et al. |

(56) References Cited

U.S. PATENT DOCUMENTS

| | | | |
|---|---|---|---|
| 2015/0165935 | A1 | 6/2015 | Sachs et al. |
| 2015/0283970 | A1 | 10/2015 | Line et al. |

FOREIGN PATENT DOCUMENTS

| | | | |
|---|---|---|---|
| DE | 3119867 A1 | 12/1982 | |
| DE | 3139945 A1 | 4/1983 | |
| DE | 3735428 A1 | 5/1989 | |
| DE | 3841688 A1 | 6/1990 | |
| DE | 4403071 A1 | 8/1994 | |
| DE | 19857386 A1 | 6/2000 | |
| DE | 10201836 A1 | 8/2003 | |
| DE | 102006061226 A1 | 6/2008 | |
| DE | 102012006074 A1 | 11/2012 | |
| EP | 0174884 B1 | 9/1987 | |
| EP | 0386890 A1 | 9/1990 | |
| EP | 0518830 A1 | 12/1992 | |
| EP | 0754590 A2 | 1/1997 | |
| EP | 0921033 A2 | 6/1999 | |
| EP | 1077154 A2 | 2/2001 | |
| EP | 0926969 B1 | 1/2002 | |
| EP | 1266794 A2 | 12/2002 | |
| EP | 1325838 A1 | 7/2003 | |
| EP | 1462318 A1 | 9/2004 | |
| EP | 1050429 B1 | 10/2005 | |
| EP | 1839932 A2 | 10/2007 | |
| EP | 1950085 A3 | 12/2008 | |
| EP | 1329356 B1 | 11/2009 | |
| EP | 2423040 A2 | 2/2012 | |
| EP | 2534979 A1 | 12/2012 | |
| EP | 2574498 A1 | 4/2013 | |
| EP | 2743124 A1 | 6/2014 | |
| FR | 2562003 A1 | 10/1985 | |
| FR | 2875753 A1 | 3/2006 | |
| JP | 61036029 A | 2/1986 | |
| JP | 2009096422 A | 5/2009 | |
| JP | 201178557 A | 4/2011 | |
| JP | 2011098588 A | 5/2011 | |
| JP | 2011251573 A | 12/2011 | |
| KR | 20080066428 A | 7/2008 | |
| KR | 1020110051692 A | 5/2011 | |
| KR | 1081192 B1 | 11/2011 | |
| KR | 101180702 B1 | 9/2012 | |
| WO | WO9511818 A1 | 5/1995 | |
| WO | 9831992 A1 | 7/1998 | |
| WO | WO9958022 A1 | 11/1999 | |
| WO | 0021797 A1 | 4/2000 | |
| WO | WO2007028015 A2 | 3/2007 | |
| WO | WO2008073285 A1 | 6/2008 | |
| WO | 2010096307 A1 | 8/2010 | |
| WO | WO2011021952 A1 | 2/2011 | |
| WO | 2011068684 A1 | 6/2011 | |
| WO | 2013040085 A2 | 3/2013 | |
| WO | 2014047417 A1 | 3/2014 | |

OTHER PUBLICATIONS

Richard A Lowry, United States Patent and Trademark Office, Non Final Office Communication re U.S. Appl. No. 13/748,847, dated Sep. 10, 2014, 14 pages.
David E Allred, United States Patent and Trademark Office, Non Final Office Communication re U.S. Appl. No. 13/748,857, dated Aug. 25, 2014, 13 pages.
Timothy J Brindley, United States Patent and Trademark Office, Final Office Communication re U.S. Appl. No. 13/749,568, dated Mar. 26, 2015, 9 pages.
Timothy J Brindley, United States Patent and Trademark Office, Non Final Office Communication re U.S. Appl. No. 13/749,568, dated Sep. 8, 2014, 9 pages.
Milton Nelson Jr., United States Patent and Trademark Office, Final Office Communication re U.S. Appl. No. 13/749,572, dated Mar. 3, 2015, 13 pages.
Milton Nelson Jr., United States Patent and Trademark Office, Non Final Office Communication re U.S. Appl. No. 13/749,572, dated Sep. 30, 2014, 20 pages.
Nicole T Verley, United States Patent and Trademark Office, Non Final Office Communication re U.S. Appl. No. 13/749,589, dated Oct. 4, 2013, 12 pages.
Timothy J Brindley, United States Patent and Trademark Office, Non Final Office Communication re U.S. Appl. No. 13/749,595, dated Aug. 28, 2014, 10 pages.
Timothy J Brindley, United States Patent and Trademark Office, Final Office Communication re U.S. Appl. No. 13/749,595, dated Jan. 12, 2015, 10 pages.
Alexander Scott Harrison, United States Patent and Trademark Office, Final Office Communication re U.S. Appl. No. 14/243,027, dated Jan. 20, 2016, 17 pages.
Alexander Scott Harrison, United States Patent and Trademark Office, Non Final Office Communication re U.S. Appl. No. 14/243,027, dated Aug. 13, 2015, 15 pages.
Ryan D Kwiecinski, United States Patent and Trademark Office, Non Final Office Communication re U.S. Appl. No. 14/230,961, dated Dec. 24, 2015, 12 pages.
Philip F Gabler, United States Patent and Trademark Office, Final Office Communication re U.S. Appl. No. 14/257,655, dated Dec. 18, 2015, 10 pages.
Philip F Gabler, United States Patent and Trademark Office, Non Final Office Communication re U.S. Appl. No. 14/257,655, dated Aug. 20, 2015, 10 pages.
Syed A Islam, United States Patent and Trademark Office, Final Office Communication re U.S. Appl. No. 14/275,368, dated Nov. 13, 2015, 13 pages.
Syed A Islam, United States Patent and Trademark Office, Non Final Office Communication re U.S. Appl. No. 14/275,368, dated May 6, 2015, 10 pages.
Laurie K Cranmer, United States Patent and Trademark Office, Non Final Office Communication re U.S. Appl. No. 14/505,675, dated Aug. 31, 2015, 7 pages.
Rodney Barnett White, United States Patent and Trademark Office, Non Final Office Communication re U.S. Appl. No. 14/600,166, dated Nov. 2, 2015, 7 pages.
Rodney Barnett White, United States Patent and Trademark Office, Final Office Communication re U.S. Appl. No. 14/534,296, dated Dec. 11, 2105, 14 pages.
Rodney Barnett White, United States Patent and Trademark Office, Non Final Office Communication re U.S. Appl. No. 14/534,296, dated Aug. 26, 2015, 13 pages.
Sanjeev Malhotra, United States Patent and Trademark Office, Non Final Office Communication re U.S. Appl. No. 14/534,285, dated Sep. 23, 2015, 14 pages.
Nicole T Verley, United States Patent and Trademark Office, Non Final Office Communication re U.S. Appl. No. 14/635,025, dated Dec. 4, 2015, 8 pages.
Timothy J Brindley, United States Patent and Trademark Office, Non Final Office Communication re U.S. Appl. No. 13/749,584, dated Sep. 15, 2014, 9 pages.
Yolanda G Giacoman, United States Patent and Trademark Office, Final Office Communication re U.S. Appl. No. 13/748,862, dated Dec. 30, 2015, 10 pages.
Yolanda G Giacoman, United States Patent and Trademark Office, Non Final Office Communication re U.S. Appl. No. 13/748,862, dated Aug. 13, 2015, 9 pages.
Yolanda G Giacoman, United States Patent and Trademark Office, Final Office Communication re U.S. Appl. No. 13/748,862, dated Mar. 10, 2015, 19 pages.
Yolanda G Giacoman, United States Patent and Trademark Office, Non Final Office Communication re U.S. Appl. No. 13/748,862, dated Sep. 25, 2014, 16 pages.
Milton Nelson Jr., United States Patent and Trademark Office, Non Final Office Communication re U.S. Appl. No. 13/749,602, dated Sep. 19, 2014, 9 pages.
Melissa Ann Black, United States Patent and Trademark Office, Non Final Office Communication re U.S. Appl. No. 13/914,666, dated Mar. 13, 2015, 6 pages.

(56) References Cited

OTHER PUBLICATIONS

Philip F Gabler, United States Patent and Trademark Office, Non Final Office Communication re U.S. Appl. No. 14/025,483, dated Dec. 17, 2014, 8 pages.
Philip F Gabler, United States Patent and Trademark Office, Final Office Communication re U.S. Appl. No. 14/025,483, dated Apr. 23, 2015, 10 pages.
Philip F Gabler, United States Patent and Trademark Office, Non Final Office Communication re U.S. Appl. No. 14/025,483, dated Aug. 18, 2015, 14 pages.
Philip F Gabler, United States Patent and Trademark Office, Final Office Communication re U.S. Appl. No. 14/025,483, dated Dec. 18, 2015, 14 pages.
Peter R Brown, United States Patent and Trademark Office, Final Office Communication re U.S. Appl. No. 14/104,780, dated Dec. 1, 2015, 5 pages.
Peter R Brown, United States Patent and Trademark Office, Non Final Office Communication re U.S. Appl. No. 14/104,780, dated Jun. 29, 2015, 9 pages.
Nicole T Verley, United States Patent and Trademark Office, Advisory Action for U.S. Appl. No. 14/056,005, dated Sep. 30, 2015, 3 pages, Feb. 26, 2018.
Nicole T Verley, United States Patent and Trademark Office, Final Office Communication re U.S. Appl. No. 14/056,005, dated Jun. 10, 2015, 8 pages.
Nicole T Verley, United States Patent and Trademark Office, Non Final Office Communication re U.S. Appl. No. 14/056,005, dated Mar. 2, 2015, 8 pages.
Peter R Brown, United States Patent and Trademark Office, Non Final Office Communication re U.S. Appl. No. 14/056,000, dated Mar. 4, 2015, 7 pages.
Peter R Brown, United States Patent and Trademark Office, Non Final Office Communication re U.S. Appl. No. 14/056,000, dated Oct. 1, 2014, 8 pages.
Philip F Gabler, United States Patent and Trademark Office, Final Office Communication re U.S. Appl. No. 14/076,893, dated Sep. 29, 2015, 13 pages.
Philip F Gabler, United States Patent and Trademark Office, Non Final Office Communication re U.S. Appl. No. 14/076,893, dated Apr. 21, 2015, 12 pages.
David E Allred, United States Patent and Trademark Office, Non Final Office Communication re U.S. Appl. No. 14/063,647, dated Aug. 18, 2015, 19 pages.
Matthew W Ing, United States Patent and Trademark Office, Non Final Office Communication re U.S. Appl. No. 14/609,092, dated Oct. 19, 2015, 11 pages.
M. Grujicic et al., "Seat-cushion and soft-tissue material modeling and a finite element investigation of the seating comfort for passenger-vehicle occupants," Materials and Design 30 (2009) 4273-4285.
Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).
Brose India Automotive Systems, "Adaptive Sensor Controlled Headrest," http://www.indiamart.com/broseindiaautomotivesystems/products.html, Oct. 9, 2012 (12 pages).
"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.
"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.
"Imola Pro-fit", Cobra, (https://www.subesports.com/cobra/imola-pro-fit/cob-6000), 2001-2017, 4 pages.
Freedman Seating Company, "Go Seat," http://www.freedmanseating.com/images/uploads/files/GOSeat_Brochure_10-19.pdf, accessed Apr. 27, 2017, 2 pgs.
Metro Magazine, "Vehicle Seating Manufacturers Offer Flexible Dseign Options, Enhanced Construction," http://www.metro-magazine.com/article/prinl/2012/01/vehicle-seating-manufacturers-offer-flexible-design-options-enahnced-construction.aspx, Jan. 2012, 3 pgs.
"Seat Comfort Systems", Installation Manual, Kit P/N: SCSOOOOOC3, http://www.techwebasto.com/accessories_main/seat_accessories/g_scs_vent_install.pdf, accessed Apr. 27, 2017, 7 pgs.
Car Reviews, "Audi A4 Saloon RS4", http://www.theaa.com/allaboutcars/cartestreports/2006037.html, Apr. 2006, 5 pgs.
Recaro GMBH & Co. KG, "Seat Range", ID No. 7218054, Mar. 2010, 21 pgs.
Kelley Blue Book, "2011 Mercedes-Benz CL-Class", http://www.kbb.com/mercedes-benz/cl-class/2011-mercedes-benz-cl-class/, Feb. 28, 2013, 5 pgs.
LEXUS, "The all-new LEXUS 2013", lexus.com P2-332, Feb. 2012, 13 pgs.
Mercedes-Benz, "Interior comfort—spoilt for choice", http://www.zungfu.com/pc_E_saloon.comfort.1.shtml, February 28, 2013, 3 pgs.
Rostra Precision Controls Inc., "Universal Lumbar Installation Instructions", http://www.rostra.com/manuals/form3132F.pdf, Nov. 2, 2007, 8 pgs.
"Seats", http://www.bavarianmw.com/guide-4400.html, www.bmwmanuals.org, 2012, 5 pgs.
Mercedes-Benz, "Seat belts and airbags", http://www.mbusa.com/vcm/MB/DigitalAssets/pdfmb/serviceandparts/seatbelts_airbags.pdf, Oct. 27, 2005, 11 pgs.
SAE International, "Capacitive Sensors Increase Safety, Comfort", http://sae.org/automag/technewsletter/071106Electronics/04.htm, Jun. 13, 2013, 3 pages.
General Motors LLC, "2013 Chevrolet Spark Owner Manual," copyright 2012, 356 pages.

* cited by examiner

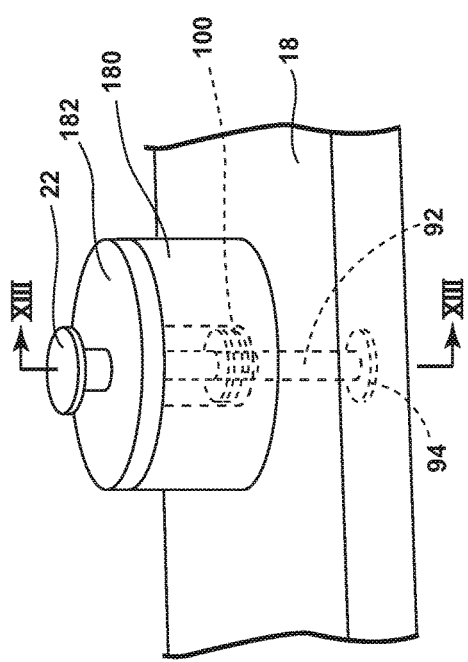
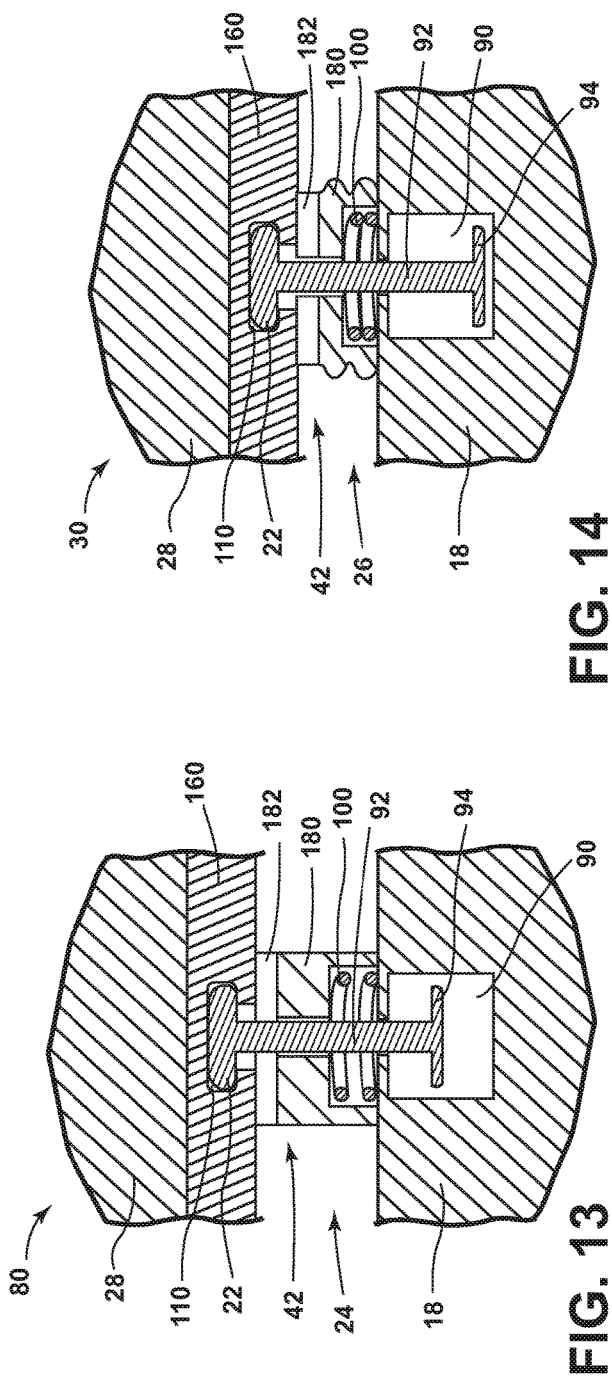

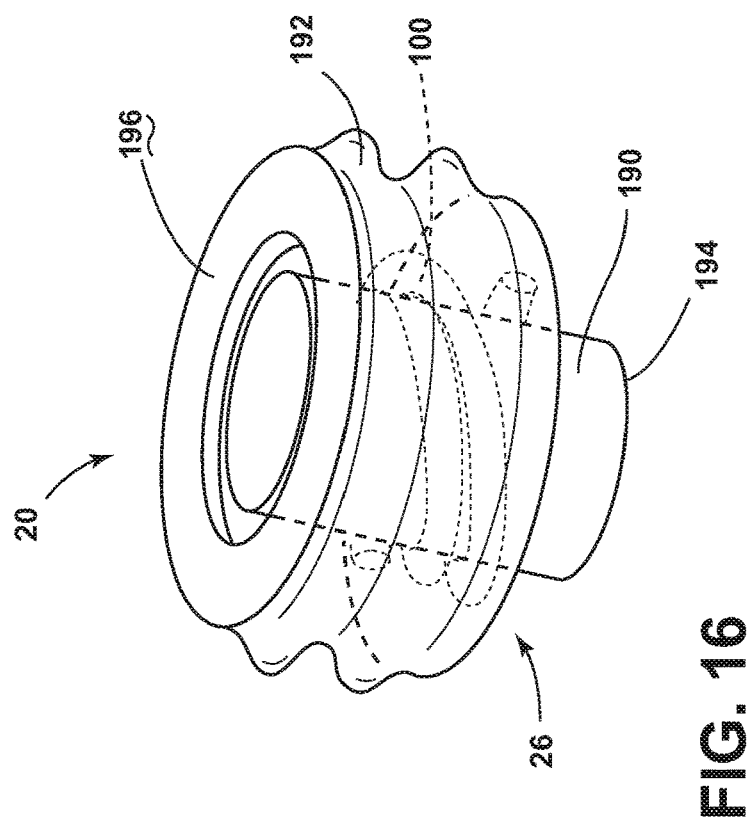
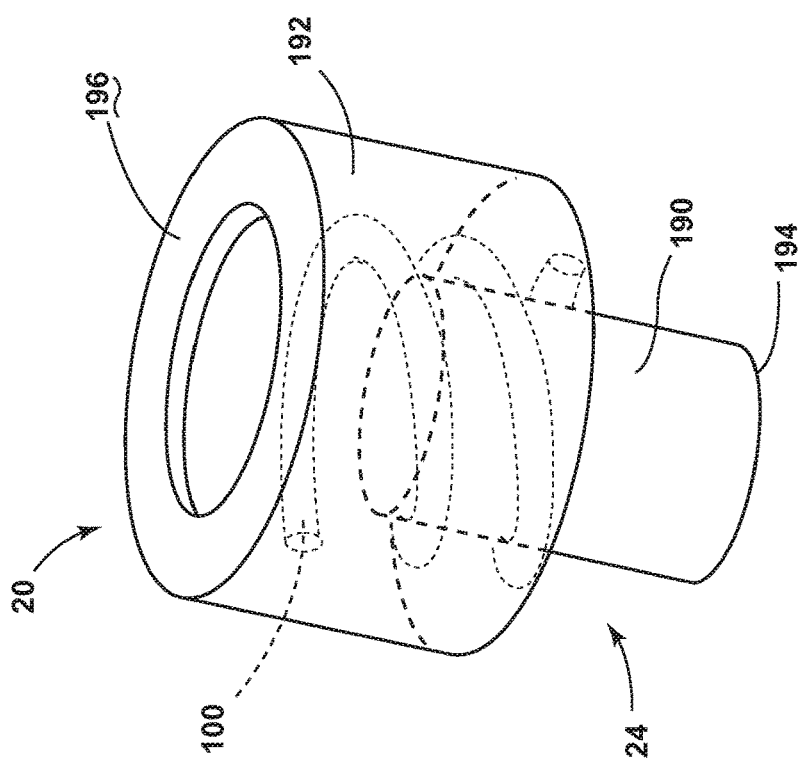

SUSPENSION SEAT BACK AND CUSHION SYSTEM HAVING AN INNER SUSPENSION PANEL

CROSS-REFERENCE TO RELATED APPLICATION

The present application is a continuation of U.S. patent application Ser. No. 14/162,072 filed Jan. 23, 2014, entitled SUSPENSION SEAT BACK AND CUSHION SYSTEM HAVING AN INNER SUSPENSION PANEL, the entire disclosure of which is hereby incorporated herein by reference.

FIELD OF THE INVENTION

The present invention generally relates to vehicle seating suspension systems, and more specifically, a vehicle seating suspension system having an inner suspension panel disposed within the vehicle seat.

BACKGROUND OF THE INVENTION

The suspension system for vehicle seating typically includes foam cushions and/or an inner spring system that attaches the seating assembly frame to the seating assembly cushion. Typically, the spring system for the seating assembly extends under the entire seat and behind the entire seatback. In this manner, the seat and seatback remain relatively stable and substantially fixed relative to the vehicle seating assembly.

SUMMARY OF THE INVENTION

In at least one aspect, a vehicle seating assembly includes a frame, an inner suspension panel coupled to the frame and a plurality of suspension members. Each suspension member has a tab that is biased away from the inner suspension panel and operable between extended and compressed positions and a cushion coupled to at least a portion of the tabs. The cushion includes a plurality of comfort positions defined by the position of each of the tabs.

In at least another aspect, a vehicle seating assembly includes a plurality of outwardly biased suspension members each extending substantially perpendicular from an inner panel. Each suspension member is operable between extended and compressed positions and has a tab end distal from the inner panel. A cushion member is engaged with at least one tab end and operable between a comfort position defined by at least one suspension member being moved to the compressed position, and a rest position.

In at least another aspect, a vehicle seating assembly includes a frame and an inner panel having a perimetrical frame and an inner aperture defined by the perimetrical frame. A plurality of suspension members are disposed proximate the perimetrical frame and are outwardly biased substantially perpendicular from the inner panel. A cushion member is connected to at least a portion of the plurality of suspension members. The plurality of suspension members bias the cushion member away from the frame.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 12 is a detail perspective view of an alternate suspension member in an extended position;

FIG. 13 is a detail cross-sectional view of the alternate suspension member of FIG. 12, taken at line XIII-XIII, with the suspension member in an extended position;

FIG. 14 is a detail cross-sectional view of the alternate suspension member FIG. 13 with the suspension member in a compressed position;

FIG. 15 is a top perspective view of another alternate embodiment of a suspension member for the inner frame suspension seating with the spring member in an extended position; and FIG. 16 is a detail perspective view of the suspension member of FIG. 15 with the suspension member in a compressed position.

DETAILED DESCRIPTION OF THE PREFERRED EMBODIMENTS

Figure 1:
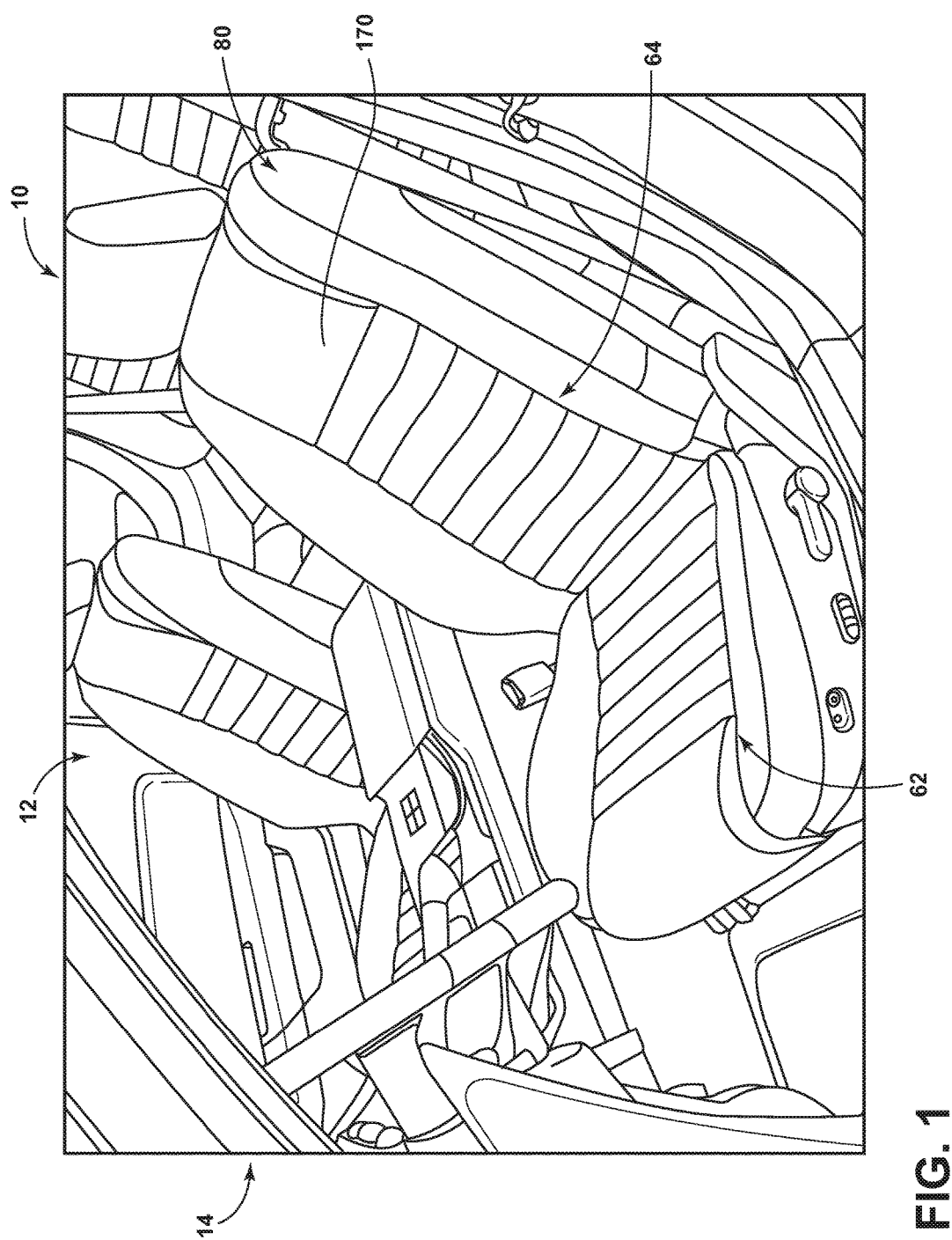
FIG. 1 is a top side perspective view of vehicle seating assembly placed within a vehicle cabin, with one embodiment of the inner frame suspension seating included within the vehicle.
Figure 2:
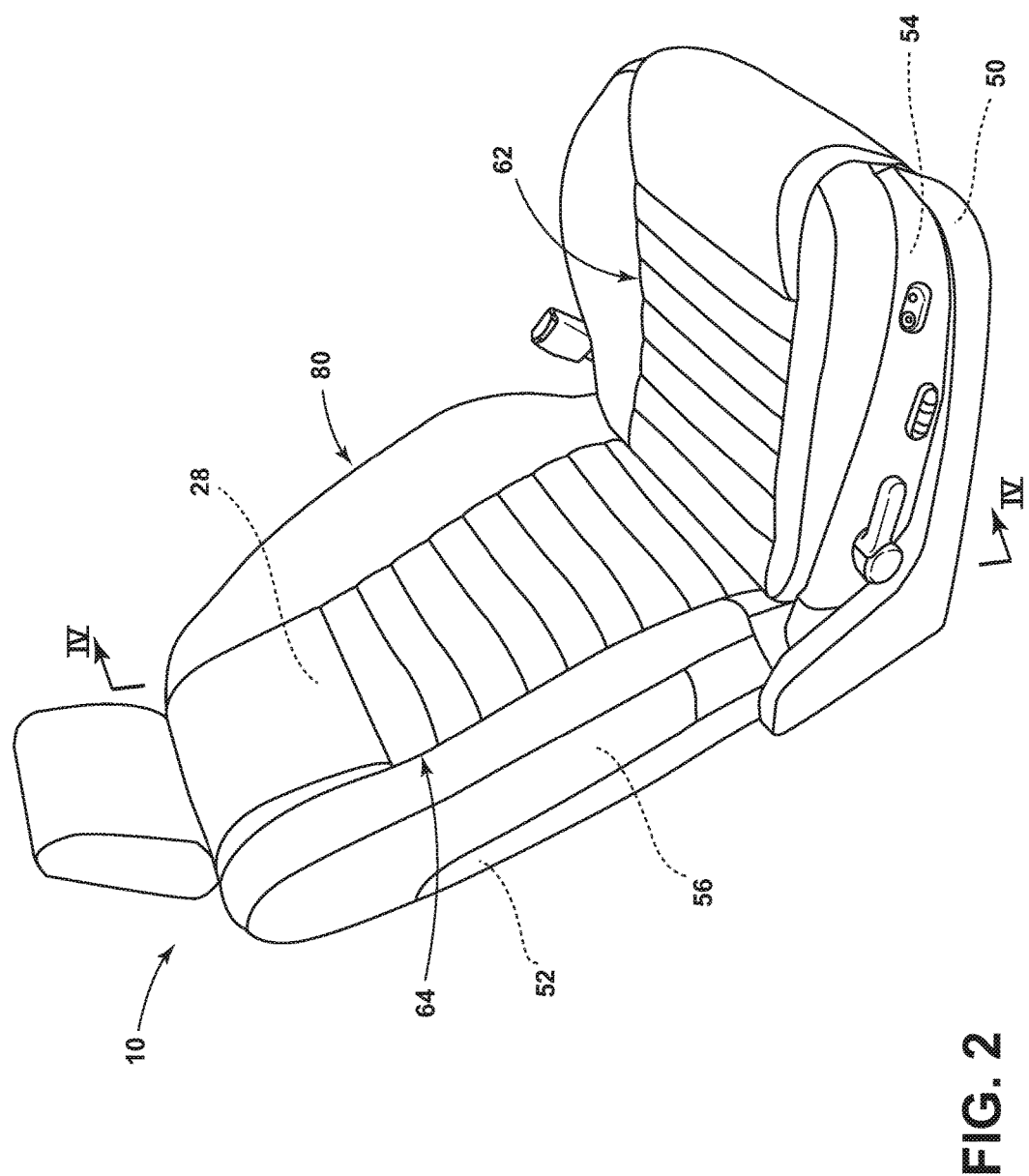
FIG. 2 is a top side perspective view of the vehicle seating assembly of FIG. 1 removed from the vehicle cabin.
Figure 3:
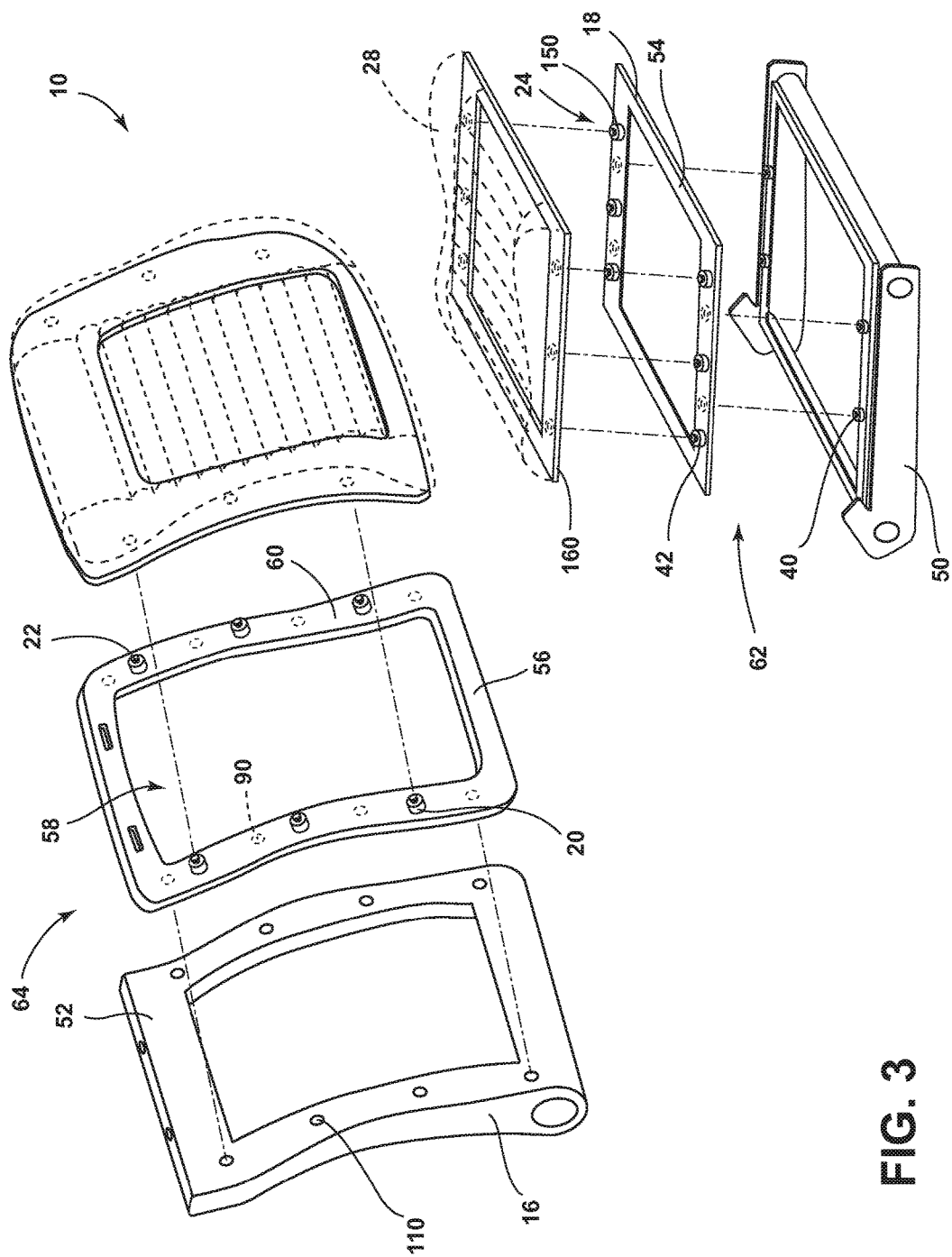
FIG. 3 is an exploded perspective view of the embodiment of FIG. 2.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-4, reference numeral 10 generally refers to a vehicle seating assembly 10 shown and installed within the vehicle cabin 12 of a vehicle 14, according to one embodiment. The vehicle seating assembly 10 includes a frame 16 and an inner suspension panel 18 that is coupled to the frame 16. A plurality of suspension members 20 are engaged with the inner suspension panel 18, wherein each of the suspension members 20 includes a tab 22 that is biased away from the inner suspension panel 18 and operable between the extended and compressed positions 24, 26. A cushion 28 is coupled to at least one of the tabs 22. The cushion 28 includes a plurality of comfort positions 30 defined by the position of each of the tabs 22.

Referring again to FIGS. 3 and 4, each of the plurality of suspension members 20 includes a set of frame suspension members 40 and a set of cushion suspension members 42. The tabs 22 of the frame suspension members 40 are coupled to the frame 16 and the tabs 22 of the cushion suspension members 42 are coupled to the cushion 28. In this manner, the plurality of comfort positions 30 of the cushion 28 are defined by the position of each of the frame suspension members 40 and the cushion suspension members 42.

Referring now to the embodiment of FIGS. 3-6, the frame 16 of the vehicle seating assembly 10 can include a seat frame 50 and a seatback frame 52 that are pivotally coupled wherein the seat frame 50 and the seatback frame 52 are operable relative to one another to provide the occupant of the vehicle seating assembly 10 with a variety of inclined and reclined seating positions. Each of the seat frame 50 and the seatback frame 52 can include a contoured profile to provide additional comfort to the occupant, wherein the contoured profile of the seat frame 50 and seatback frame 52 substantially matches the curvature of an individual's lower body and back, respectively. Attached to each of the seat frame 50 and seatback frame 52 is the inner suspension panel 18, wherein a seat inner suspension panel 54 is attached to the seat frame 50 and a seatback inner suspension panel 56 is attached to the seatback frame 52. Each of the seat and seatback inner suspension panels 54, 56 include a central aperture 58 defined by a perimetrical frame 60 that defines an outer edge of the central aperture 58. The frame and cushion suspension members 40, 42 are attached to each of the seat and seatback inner suspension panels 54, 56, respectively, at the perimetrical frame 60. Accordingly, each of the suspension members 20 provides support around the perimeter of the seat 62 and seatback 64 of the vehicle seating assembly 10. The suspension members 20 provide individualized support at various points around the perimetrical frame 60 of the inner suspension panel 18. Additionally, the suspension members 20 provide cushioning support at both sides of the inner suspension panel 18, such that the inner suspension panel 18 is suspended between the cushion 28 and the frame 16. In this manner, the cushion 28 is operable relative to the inner suspension panel 18, and both the cushion 28 and the inner suspension panel 18 are operable relative to the frame 16 of the vehicle seating assembly 10. The outer suspension layer 70 between the cushion 28 and the inner suspension panel 18 and the inner suspension layer 72 between the frame 16 and the inner suspension panel 18 each provide an additional layer of support, such that the vehicle seating assembly 10 can be manipulated into a variety of comfort positions 30 to accommodate the various sizes and shapes of occupants. Various seating configurations can also be achieved to accommodate a wide variety of occupants.

Figure 4:
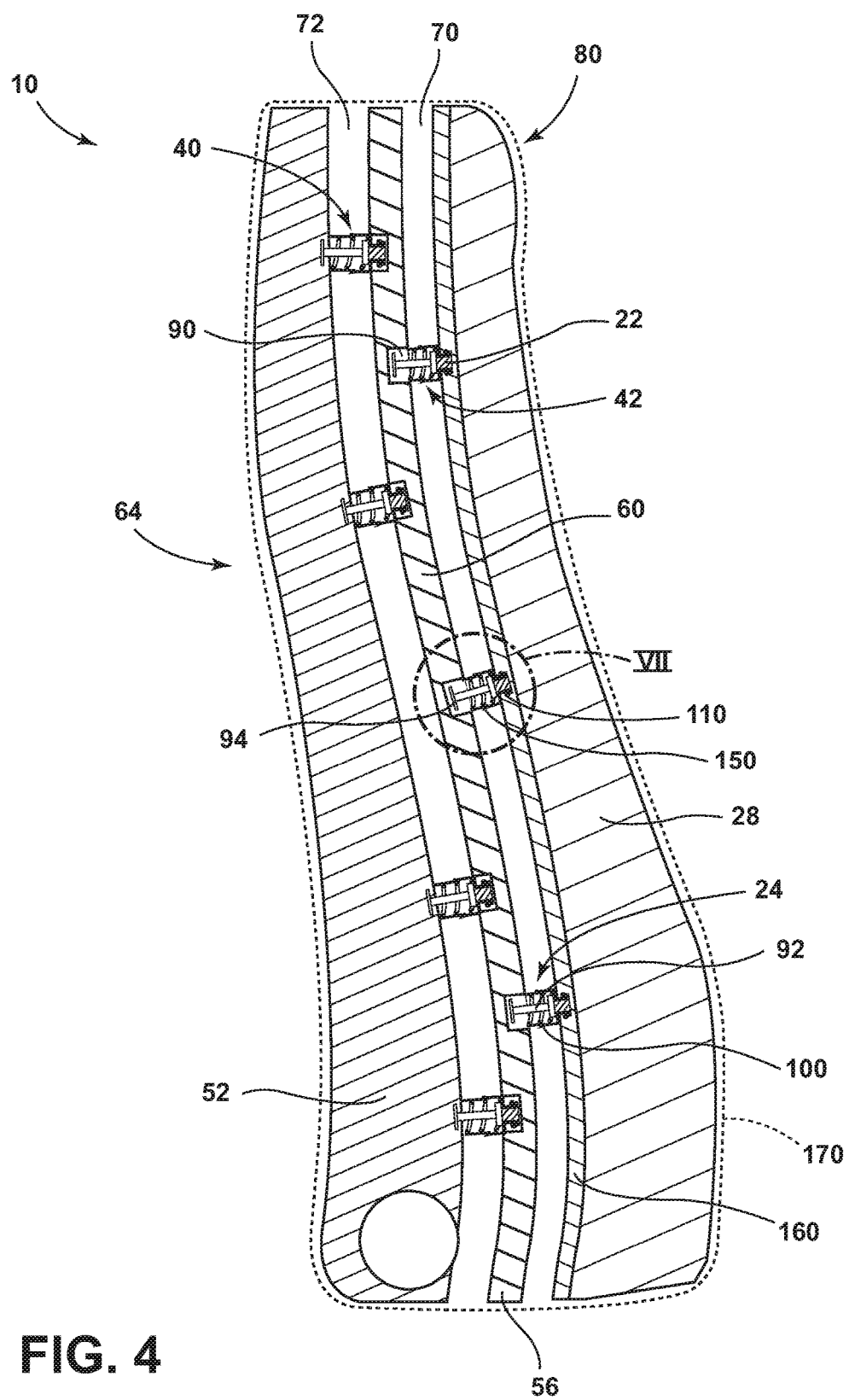
FIG. 4 is a cross-sectional view of a seatback of the vehicle seating assembly of FIG. 2, taken at line IV-IV, with the seatback in a rest position.
Figure 5:
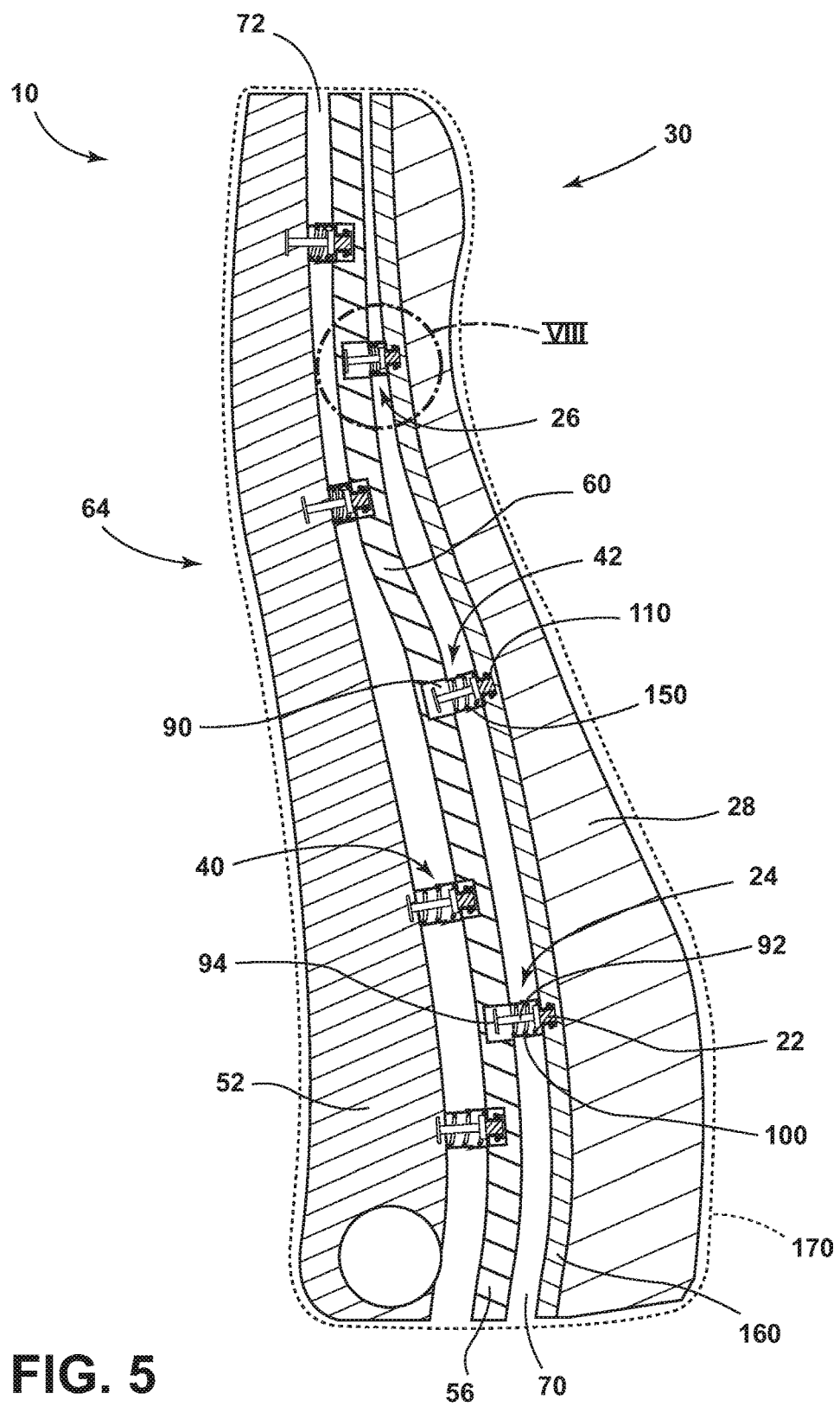
FIG. 5 is the cross-sectional view of the embodiment of FIG. 4 with the seatback in one of the comfort positions.
Figure 6:
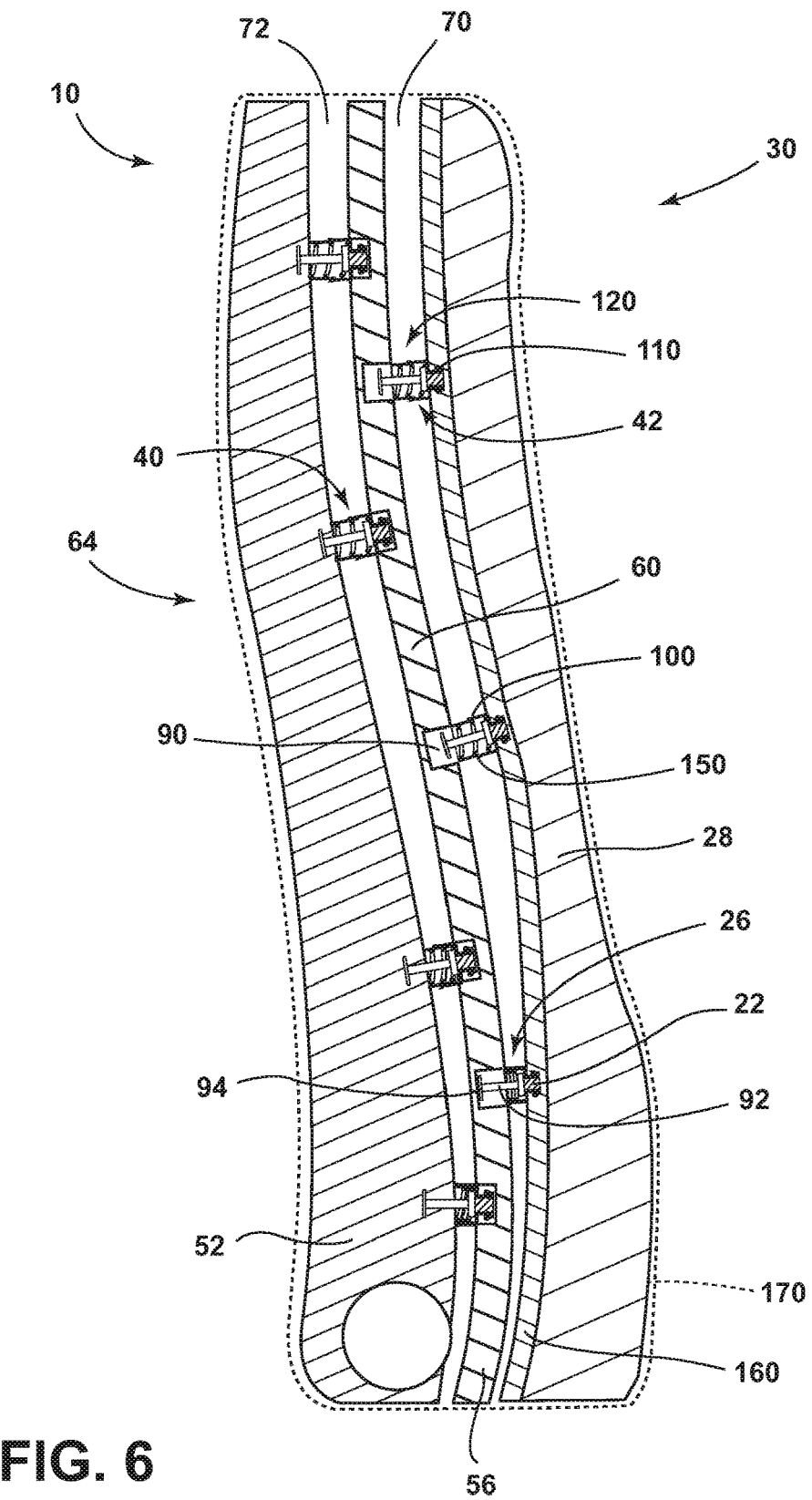
FIG. 6 is the cross-sectional view of the embodiment of FIG. 4, with the seatback in another comfort position.

As illustrated in the embodiment of FIGS. 4-6, the vehicle seating assembly 10 includes a rest position 80, wherein each of the suspension members 20 are substantially in the extended position 24. The rest position 80 typically occurs when no occupants, objects or other loads are placed upon the vehicle seating assembly 10. Alternatively, when a load is placed upon the vehicle seating assembly 10, one or more of the suspension members 20 is at least partially compressed and the vehicle seating assembly 10 is placed in one of the comfort positions 30. Each comfort position 30 is defined by the positioning of each of the suspension members 20 when at least one of the suspension members 20 is placed in one of the compressed positions 26. It is contemplated that the compressed position 26 of the suspension member 20 is defined by the suspension member 20 being at least partially compressed so as not to be in the extended position 24.

Referring now to the embodiments of FIGS. 4-8, the inner suspension panel 18 defines a plurality of attachment portions 90, wherein each of the attachment portions 90 are positioned proximate the perimetrical frame 60 of the inner suspension panel 18. In this manner, each of the suspension members 20 is coupled at a corresponding attachment portion 90 of the perimetrical frame 60 of the inner suspension panel 18. Additionally, each of the suspension members 20 includes a suspension pin 92 that extends from the attachment portion 90 of the inner suspension panel 18 to the corresponding tab 22 that is coupled to the cushion 28 of the frame 16. It is contemplated that each attachment portion 90 is defined by a recess within the inner suspension panel 18, wherein the attachment portion 90 provides space to allow the suspension member 20 to move between the extended and compressed positions 24, 26. Each suspension pin 92 includes a coupling member 94 that connects to the attachment portion 90 of the inner suspension panel 18. In this manner, the compressed position 26 of the suspension member 20 is defined by the tab 22 being positioned proximate the inner suspension panel 18 and the extended position 24 of the suspension member 20 is defined by the tab 22 being positioned distal from the inner suspension panel 18. In various embodiments, the suspension pin 92 can include first and second ends, wherein the first end includes the coupling member 94 and the second end includes the tab 22. It is contemplated that the coupling member 94 is operable within the attachment portion 90 of the inner suspension panel 18 and the tab 22 is attached to the frame/cushion 16, 28. It is contemplated that the tab 22 and coupling member 94 can also be reversed. In the various embodiments, the movement of the suspension pin 92 relative to the inner suspension panel 18, the cushion 28 and/or the frame 16 provides the suspension support for the vehicle seating assembly 10.

Referring again to FIGS. 5-8, each of the suspension members 20 can include a spring 100 disposed proximate the suspension pin 92 that is disposed between the coupling member 94 and the tab 22. It is contemplated that the spring 100 is configured to bias the tab 22 toward the extended position 24. For the cushion suspension members 42, the spring 100 is configured to bias the cushion 28 away from the inner suspension panel 18. Similarly, for the frame suspension members 40, the spring 100 is configured to bias the frame 16 away from the inner suspension panel 18. The springs 100 of the cushion suspension members 42 and the frame suspension members 40 cooperate to provide multiple levels of biasing force that suspend the cushion 28 away from the frame 16 and also suspend the inner suspension panel 18 between the cushion 28 and the frame 16.

In various embodiments, it is contemplated that the suspension pin 92 may include multiple components that operate linearly relative to one another. In such an embodiment, the spring 100 can be disposed within the suspension pin 92, wherein the spring 100 is configured to bias ends of the suspension pin 92 toward the extended position 24. Additionally, in such an embodiment, the coupling member 94 can be fixed within the attachment portion 90 and the tab 22 can be fixed within either the cushion 28 or the frame 16.

Referring again to the embodiment of FIGS. 5-8, the cushion 28 and the frame 16 can include a plurality of tab receptacles 110 that are configured to receive the tabs 22 of the cushion suspension members 42 and the frame suspension members 40, respectively. It is contemplated that the tab receptacles 110 are configured to form an interference fit with each of the tabs 22 of the suspension members 20, wherein the tabs 22 of the suspension members 20 are substantially fixed within the tab receptacles 110. The types of connection mechanisms that attach the tabs 22 within the tab receptacles 110 can include, but are not limited to, snaps, tabs, hooks, pins, and other similar interference mechanisms. In various embodiments, each of the coupling members 94 of the cushion and frame suspension members 42, 40 are configured to engage the inner suspension panel 18.

As shown in the embodiment of FIGS. 5-8, it is contemplated that the coupling members 94 can be operable within the inner suspension panel 18, wherein the coupling members 94 are slidably engaged with the attachment portions 90 of the inner suspension panel 18 to provide for movement of the suspension pin 92 of the suspension member 20. In this manner, the movement of the coupling members 94 within the attachment portions 90 allows the cushion 28 to operate relative to the inner suspension panel 18 and the inner suspension panel 18 to operate relative to the frame 16. In various alternate embodiments, it is contemplated that at least a portion of the tabs 22 of the suspension members 20 can be configured to couple to the inner suspension panel 18 and at least a portion of the coupling members 94 of the suspension members 20 can be configured to engage either the cushion 28 or the frame 16. In such an embodiment, the tab receptacles 110 can be disposed within the perimetrical frame 60 of the inner suspension panel 18 and the coupling members 94 of the suspension members 20 can be slidably engaged with one of the cushion and the frame 16 to provide for the cushioning movement of the vehicle seating assembly 10 in the various comfort positions 30 defined thereby.

As illustrated in the embodiment of FIGS. 4-8, each of the suspension members 20 is configured to be perpendicularly biased away from the inner suspension panel 18. As the occupant sits within the vehicle seating assembly 10 and the occupant's weight is disposed upon each of the suspension members 20, each of the suspension members 20 moves away from the extended position 24 and toward any one of a plurality of compressed positions 26, wherein at least a portion of the frame 16 and cushion suspension members 42 are at least partially compressed toward the inner suspension panel 18. In various embodiments, each of the suspension members 20 can be configured to move at least partially in a non-perpendicular direction, such that the cushion 28 can shift at least partially relative to the inner suspension panel 18 and the inner suspension panel 18 can shift at least partially relative to the frame 16 as the occupant sits within the vehicle seating assembly 10. In this manner, the vehicle seating assembly 10 can provide cushioning perpendicular to the inner suspension panel 18 and also can provide lateral or shifting support to the occupant. In the various embodiments, each suspension member 20 is configured to operate between the extended and compressed positions 24, 26 independent of the other suspension members 20. Accordingly, the suspension members 20 allow the cushion 28 of the vehicle seating assembly 10 to receive and support a wide range of body types and usage configurations.

In various embodiments, as illustrated in FIGS. 4-6, the comfort positions 30 of the vehicle seating assembly 10 may be defined by at least one of the suspension members 20 being disposed in a hyper-extended position 120, wherein the suspension member 20 is extended beyond the extended position 24. Where the suspension member 20 is in a hyper-extended position 120, the spring 100 can be configured to bias the suspension member 20 from the hyper-extended position 120 to the extended position 24. Accordingly, the vehicle seating assembly 10 is configured to operate in a plurality of directions to substantially account for the comfort and movement of the occupant of the vehicle seating assembly 10.

Figure 9:
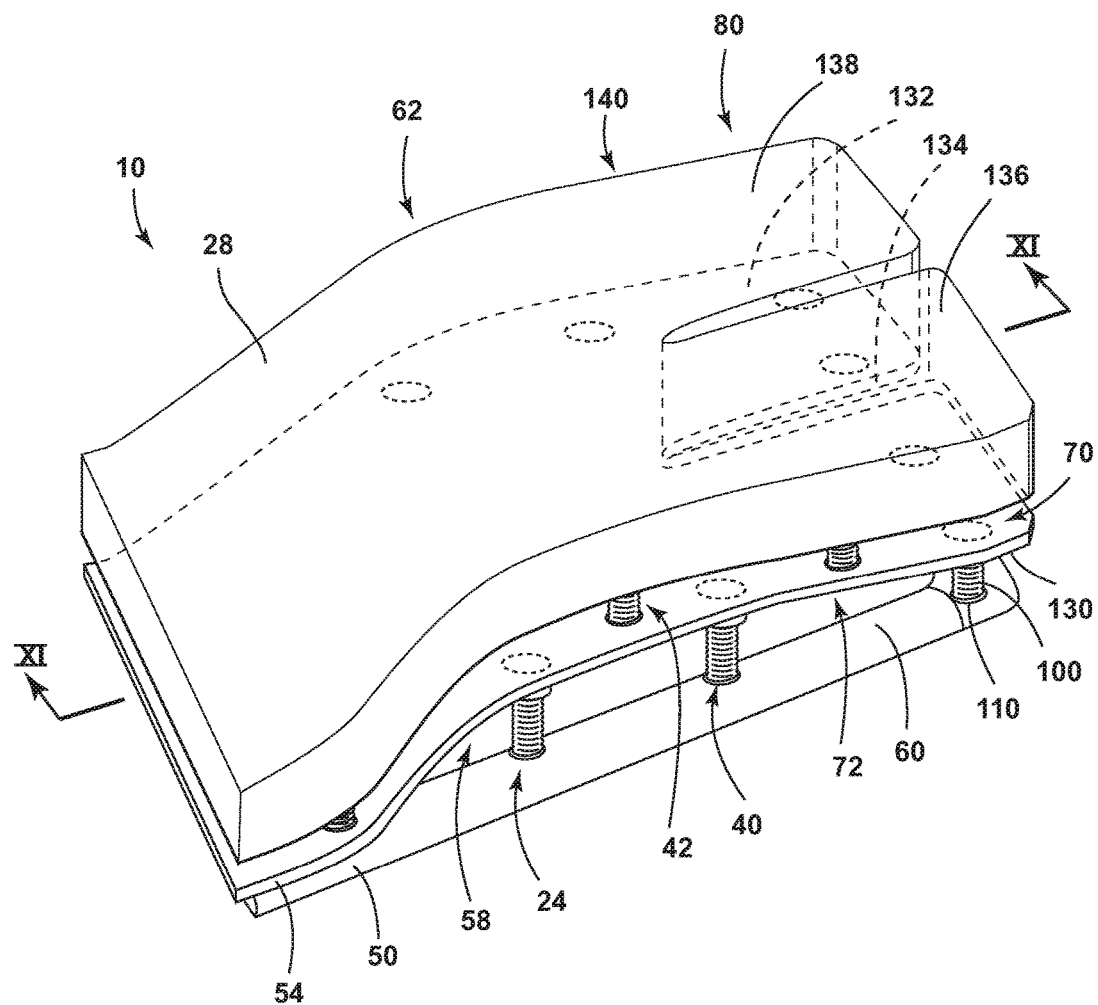
FIG. 9 is a top perspective view of an embodiment of a seat of the vehicle seating assembly.
Figure 10:
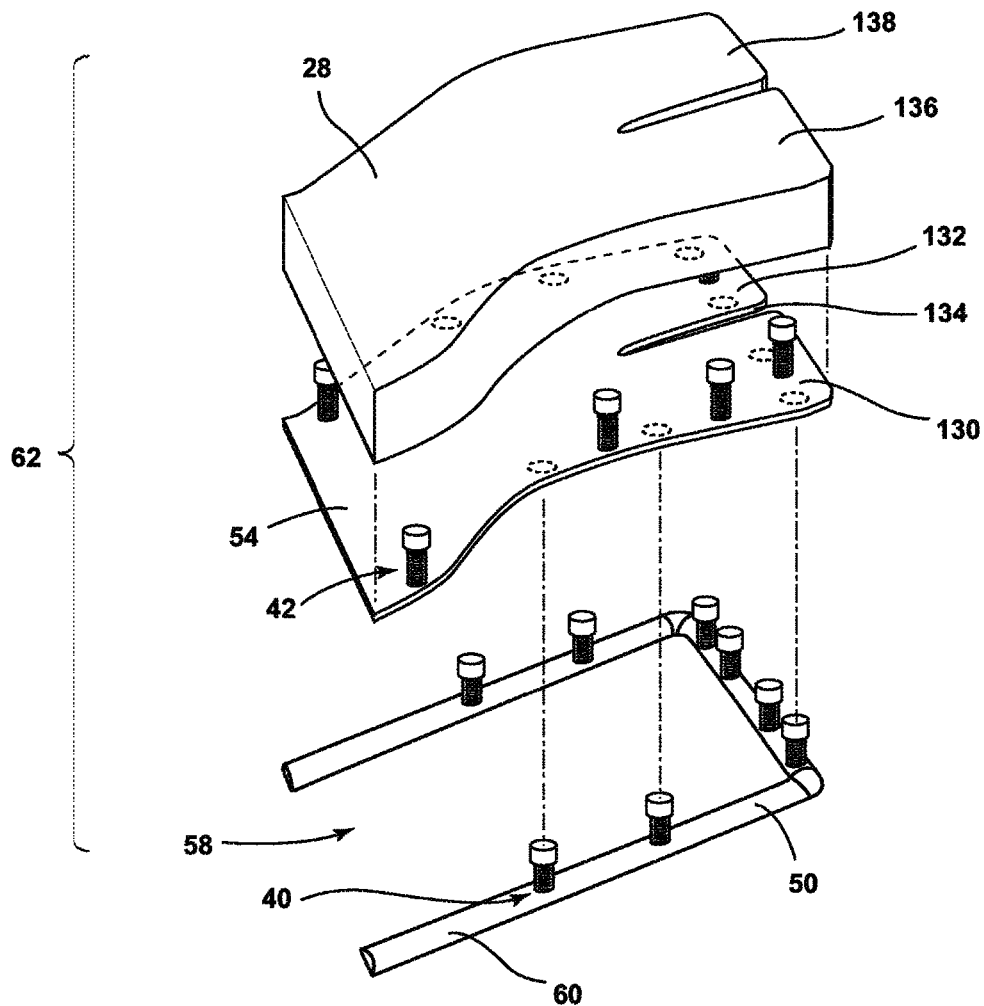
FIG. 10 is an exploded perspective view of the embodiment of FIG. 9.
Figure 11:
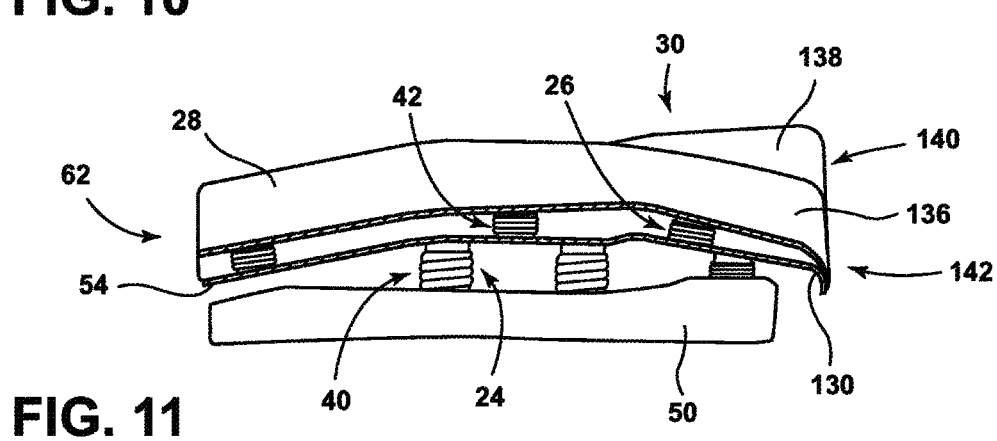
FIG. 11 is a cross-sectional view of the embodiment of FIG. 9, taken at line XI-XI, with one of the suspension members in the lowered position.

Referring now to the embodiment of FIGS. 9-11, the seat 62 of the vehicle seating assembly 10 can include a seat inner suspension panel 54 and a cushion 28 that define independently operable right and left leg supports 130, 132. In such an embodiment, the seat inner suspension panel 54 can include a dividing slot 134 between the right and left leg supports 130, 132, wherein the right and left leg supports 130, 132 are operable independently of one another to provide individualized support to each of the right and left legs of the occupant. It is contemplated that the cushion 28 of the seat 62 can also include right and left leg portions 136, 138 that are individually operable with the right and left leg supports 130, 132 of the seat inner suspension panel 54. Alternatively, it is contemplated that, in various embodiments, the cushion 28 can be free of a dividing slot 134 and the cushion 28 can be configured to twist, stretch, bend and otherwise be manipulated to accommodate the independent movements of the right and left leg supports 130, 132 of the seat inner suspension panel 54 to allow for the movement of the occupant's right and left legs relative to the seat 62. In the various embodiments, the attachment of the seat inner suspension panel 54 at the right and left leg supports 130, 132 is substantially similar to that described above, wherein cushion suspension members 42 couple the cushion 28 to the inner suspension panel 18 and frame suspension members 40 couple the seat inner suspension panel 54 to the frame 16 of the seat 62.

Referring again to the embodiment of FIGS. 9-11, as the occupant uses the vehicle seating assembly 10 having the right and left leg supports 130, 132, the occupant's leg movements, and in particular the driver's leg movements, are received and accommodated by the right and left leg supports 130, 132. By way of explanation, and not limitation, where the driver's seat includes the right and left leg supports 130, 132, as the driver uses the gas pedal, brake pedal, clutch, or other foot controls, the right and left leg supports 130, 132 of the seat 62 and the suspension members 20 disposed therein provide individualized support to each of the occupant's legs as the driver's legs move during operation of the vehicle 14. Accordingly, the comfort position 30 provided by the vehicle seating assembly 10 continually changes along with the movements of the driver during operation of the vehicle 14. During the operation of the vehicle 14, each of the right and left leg supports 130, 132 is individually operable between an upper position and a lower position 140, 142, to accommodate the movement of the occupant's legs while driving the vehicle 14 or while sitting within one of the passenger seats of the vehicle 14.

Figure 7:
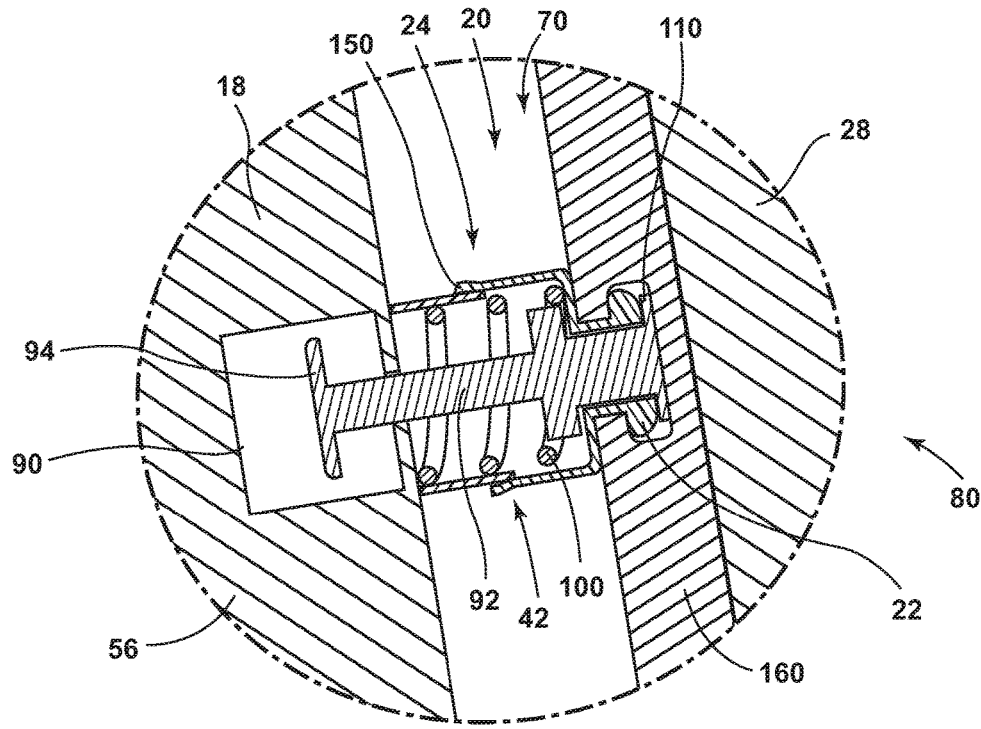
FIG. 7 is a detail cross-sectional view of the embodiment of FIG. 4, taken at area VII with the suspension member in an extended position.
Figure 8:
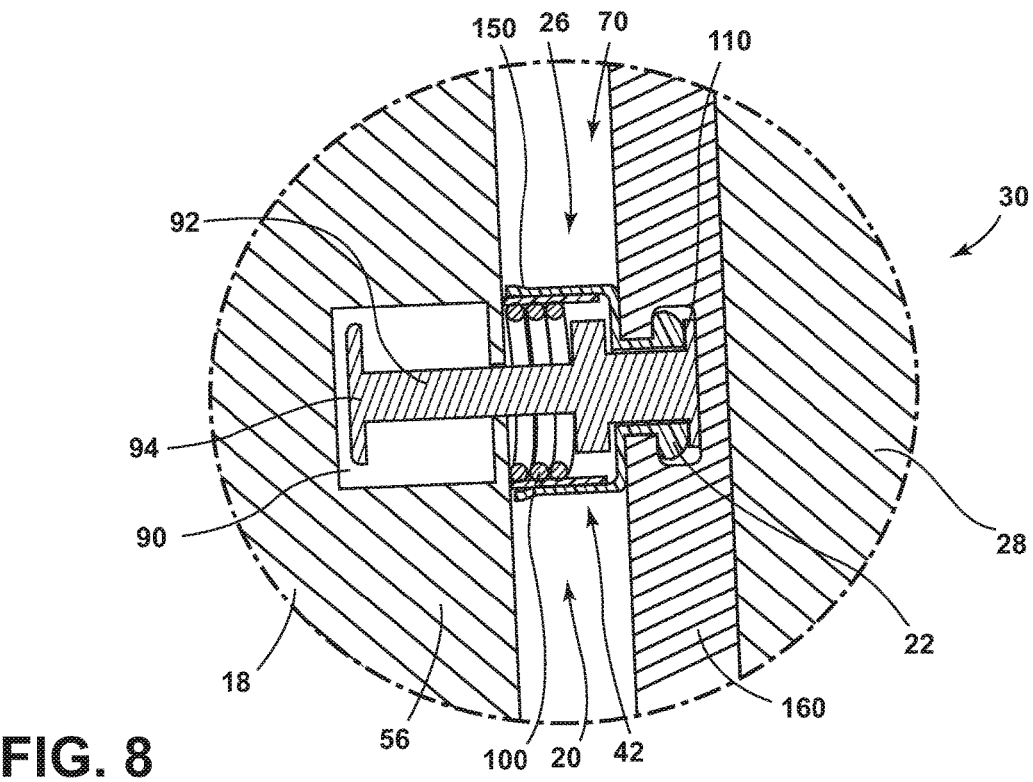
FIG. 8 is a detail cross-sectional view of the embodiment of FIG. 5 taken at area VIII with the suspension member in a compressed position.

Referring again to the embodiment of FIGS. 7 and 8, in various embodiments, each of the suspension members 20 can include a flexible gasket 150 that surrounds the suspension pin 92 and the spring 100 to prevent dust, dirt and debris from interfering with the operation of the suspension member 20. The flexible gasket 150 can include a single flexible member 192 or can include a plurality of members that are configured to slidably engage one another as the suspension member 20 operates between the compressed and extended positions 26, 24.

In various embodiments, as illustrated in FIGS. 3-11, the frame 16 of the vehicle seating assembly 10 can be made of one or more of a plurality of materials that can include, but are not limited to, metal, plastic, composite, combinations thereof, and other substantially rigid materials that are configured to be securely coupled to the frame 16 of the vehicle 14 and also configured to receive the frame suspension members 40 of the vehicle seating assembly 10. The inner suspension panels 18 of the vehicle seating assembly 10 is configured to be made of materials that include, but are not limited to, metal, plastic, composite, wood, combinations thereof, and other substantially rigid materials that are configured to receive the cushion and frame suspension members 42, 40. It is contemplated that in various embodiments, at least one of the frame 16 and the inner suspension panels 18 can be configured to flex, bend, or have at least some limited elastic movement to provide additional layers of comfort to the occupant during operation of the vehicle 14. In the various embodiments, the cushion 28 of the vehicle seating assembly 10 can include a substantially rigid backing member 160 that defines the tab receptacles 110 and/or the attachment portions 90 that are configured to receive the tabs 22 and/or coupling members 94, respectively, of the cushion suspension members 42. This backing member 160 of the cushion 28 can be made of various materials that can include, but are not limited to, plastic, wood, metal, and other substantially rigid materials. Similar to the inner suspension panels 18 and frame 16, the cushion backing can be configured to include some limited flexible movement to provide additional comfort to the occupant of the vehicle 14. The cushion 28, in the various embodiments, can also include one or more cushioning materials that can include, but are not limited to, polyurethane foam, memory foam, cotton, other synthetic cushioning materials, other natural cushioning materials, combinations thereof, and other similar cushioning materials.

In the embodiments illustrated in FIGS. 4-6, the vehicle seating assembly 10 can include a cover member 170 that extends over the cushion 28, the inner suspension panel 18, and at least a portion of the frame 16 of the seat 62 and the seatback 64, wherein the cover member 170 can be made of various materials that can include, but are not limited to, vinyl, leather, plastic, cotton, and other substantially flexible and at least partially elastic materials that are configured to cover the vehicle seating assembly 10. It is contemplated that the cover member 170 is at least partially flexible and/or elastic to account for the movement of the cushion 28 and the inner suspension panel 18 between the rest position 80 and the plurality of comfort positions 30.

As illustrated in the embodiments of FIGS. 1-11, the vehicle seating assembly 10 described above can be installed in a variety of seating positions, within the vehicle cabin 12. These positions include, but are not limited to, driver's seat, passenger seat, rear seat, or other seating location. It is also contemplated that the vehicle seating assembly 10 described above can also be disposed within a wide variety of vehicles, such as SUVs, CUVs, four-door vehicles, two-door vehicles, pick-up trucks, and others.

Referring now to the embodiments illustrated in FIGS. 12-16, the cushion and frame suspension members 42, 40 can include foam or rubberized biasing members 180 that are configured to provide the biasing force for the suspension members 20. The foam or rubberized biasing member 180 can be included instead of, or in addition to, the spring 100, wherein the foam or rubberized biasing member 180 is configured to position the suspension member 20 between the extended and compressed positions 24, 26. Various suspension members 20 can also include a base plate 182 proximate the tab 22 of the suspension member 20 that is configured to compress the spring and/or biasing member 100, 180 into the compressed position 26 as the occupant exerts force against the vehicle seating assembly 10. In various alternate embodiments, the suspension members 20 can include a post 190 coupled with a flexible member 192, wherein the flexible member 192 can include a spring 100 and/or a flexible gasket 100, 150. In such an embodiment, a connection end 194 of the post 190 is coupled to the inner suspension panel 18 and an attachment surface 196 of the flexible gasket 150 is attached to either the cushion 28 or the frame 16, depending upon whether the suspension member 20 is a cushion suspension member 42 or frame suspension member 40. It is contemplated that in various embodiments, the connection end 194 of the post 190 can be attached to either the frame 16 or the cushion 28 and the attachment surface 196 of the flexible gasket 150 can be attached to the inner suspension panel 18.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A vehicle seating assembly comprising:
   an inner suspension panel coupled to a frame and including frame and cushion suspension members, each having a tab biased away from the inner suspension panel and operable between extended and compressed positions; and
   a cushion having a tab receptacle that receives the tab of the cushion suspension member, and wherein a plurality of comfort positions of the cushion are defined by positions of the frame and cushion suspension members.

2. The vehicle seating assembly of claim 1, wherein the frame suspension member and the cushion suspension member each include a biasing member, wherein the biasing member includes at least one of a foam biasing member and a rubberized biasing member.

3. The vehicle seating assembly of claim 1, further comprising:
   a plurality of attachment members that attach the frame to the inner suspension panel, wherein the plurality of attachment members are disposed proximate a perimetrical frame of the inner suspension panel.

4. The vehicle seating assembly of claim 1, wherein the inner suspension panel defines a central aperture and a perimetrical frame defining an outer edge of the central aperture, wherein the frame and cushion suspension members are attached to the inner suspension panel at the perimetrical frame.

5. The vehicle seating assembly of claim 4, further comprising:
   a seat, wherein the inner suspension panel and the cushion define independently operable right and left leg supports of the seat.

6. The vehicle seating assembly of claim 1, wherein each of the frame and cushion suspension members includes a suspension pin that extends from the inner suspension panel to a corresponding tab, wherein each suspension pin includes a coupling member that connects each of the frame suspension members and each of the cushion suspension members to the inner suspension panel, wherein the compressed position is defined by the corresponding tab being positioned proximate the inner suspension panel, and wherein the extended position is defined by the corresponding tab being positioned distal from the inner suspension panel.

7. The vehicle seating assembly of claim 6, wherein each of the frame and cushion suspension members includes a biasing member disposed proximate the suspension pin between the coupling member and the tab, wherein the biasing member biases the coupling member toward the extended position.

8. The vehicle seating assembly of claim 7, wherein the biasing member is a foam biasing member.

9. The vehicle seating assembly of claim 8, wherein each suspension member includes a flexible gasket positioned proximate the foam biasing member between the coupling member and the tab.

10. A vehicle seat comprising:
    outwardly-biased suspension members, each extending to a corresponding tab end from an inner panel having a central aperture; and
    a cushion having independently-operable leg supports engaged with at least one corresponding tab end and operable between a rest position, wherein the corresponding tab ends are in an extended position, and a comfort position, wherein at least one suspension member is in a compressed position distal from the extended position.

11. The vehicle seat of claim 10, wherein each suspension member includes a foam biasing member that is compressible to define the compressed position.

12. The vehicle seat of claim 11, wherein each suspension member includes a flexible gasket positioned proximate the foam biasing member.

13. The vehicle seat of claim 11, wherein the independently-operable leg supports extend from the cushion, and wherein the cushion and the independently-operable leg supports are biased away from the inner panel by at least one suspension member.

14. The vehicle seat of claim 11, wherein the cushion includes a plurality of receptacles that each receive at least one corresponding tab end of the suspension members.

15. The vehicle seat of claim 11, further wherein each suspension member includes a suspension pin that includes a coupling member that engages the inner panel, wherein the suspension pin slidably engages the inner panel to define the extended and compressed positions of the suspension members.

16. The vehicle seat of claim 11, wherein the inner panel includes a perimetrical frame, wherein an outer edge of the central aperture defines the perimetrical frame of the inner panel.

17. The vehicle seat of claim 16, further comprising:
    a plurality of attachment members that attach the inner panel to a seat frame, wherein the plurality of attachment members are disposed proximate the perimetrical frame.

18. The vehicle seat of claim 10, wherein each suspension member includes a rubberized biasing member that is compressible to define the compressed position.

19. A vehicle seating assembly comprising:
    an inner panel having a perimetrical frame and an inner aperture defined by the perimetrical frame;
    a plurality of suspension members proximate the perimetrical frame and outwardly biased substantially perpendicular from the inner panel to respective tab ends; and
    a cushion having tab receptacles for receiving a portion of respective tab ends, wherein each suspension member includes a foam biasing member that biases the suspension member away from a seat frame.

20. The vehicle seating assembly of claim 19, wherein each suspension member includes an extended position defined by the respective tab end of the suspension member being fully biased away from the frame, and a compressed position defined by the respective tab end of the suspension member being distal from the extended position.

* * * * *